(12) United States Patent
Xiao et al.

(10) Patent No.: US 12,041,644 B2
(45) Date of Patent: Jul. 16, 2024

(54) CHANNEL MEASUREMENT METHOD AND APPARATUS

(71) Applicant: Huawei Technologies Co., Ltd., Shenzhen (CN)

(72) Inventors: Jiehua Xiao, Shenzhen (CN); Zhe Liu, Shanghai (CN); Hao Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 17/371,616

(22) Filed: Jul. 9, 2021

(65) Prior Publication Data

US 2021/0337560 A1 Oct. 28, 2021

Related U.S. Application Data

(63) Continuation of application No. PCT/CN2020/070362, filed on Jan. 4, 2020.

(30) Foreign Application Priority Data

Jan. 11, 2019 (CN) .................. 201910028812.X

(51) Int. Cl.
*H04W 72/54* (2023.01)
*H04L 1/1812* (2023.01)
(Continued)

(52) U.S. Cl.
CPC .......... *H04W 72/54* (2023.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS 9,087,384 B2 7/2015 Holeva et al.
10,455,635 B2 10/2019 Park et al.
(Continued)

FOREIGN PATENT DOCUMENTS

CN 103875021 A 6/2014
CN 105589506 A 5/2016
(Continued)

OTHER PUBLICATIONS

"UE Adaptation Schemes," Agenda Item: 7.2.9.2.1, Source: Samsung, Document for: Discussion and decision, 3GPP TSG RAN WG1 Meeting #95, R1-1813011, Spokane, USA, Nov. 12-16, 2018, 11 pages.
(Continued)

*Primary Examiner* — Diane L Lo
(74) *Attorney, Agent, or Firm* — SLATER MATSIL, LLP

(57) ABSTRACT

A method, including sending a configuration of a first channel state information reference signal (CSI-RS) resource periodicity and a configuration of a first channel state information (CSI) report periodicity that are of a secondary cell of a terminal device, the first CSI-RS resource periodicity associated with sending a first CSI-RS in a first time period, and the first CSI report periodicity associated with receiving CSI of the secondary cell from the terminal device in the first time period, and sending a configuration of a second CSI-RS resource periodicity and a configuration of a second CSI report periodicity that are of a secondary cell of the terminal device, the second CSI-RS resource periodicity associated with sending a second CSI-RS in a second time period, and the second CSI report periodicity associated with receiving CSI of the secondary cell from the terminal device in the second time period.

17 Claims, 8 Drawing Sheets

(51) Int. Cl.
*H04L 1/1867* (2023.01)
*H04L 5/00* (2006.01)
*H04L 27/26* (2006.01)
*H04W 72/0453* (2023.01)
*H04W 72/23* (2023.01)

(52) U.S. Cl.
CPC ...... *H04L 5/0051* (2013.01); *H04L 27/26025* (2021.01); *H04W 72/0453* (2013.01); *H04W 72/23* (2023.01)

(56) References Cited

U.S. PATENT DOCUMENTS

| | | | |
|---|---|---|---|
| 11,211,988 | B2 | 12/2021 | Liu |
| 2015/0208269 | A1* | 7/2015 | Damnjanovic ....... H04L 5/0098 370/252 |
| 2015/0236825 | A1 | 8/2015 | Park et al. |
| 2015/0304076 | A1* | 10/2015 | Lee .................... H04L 23/00 370/329 |
| 2016/0143055 | A1* | 5/2016 | Nammi ................ H04B 7/0617 370/329 |
| 2017/0156152 | A1* | 6/2017 | Nazar ............... H04W 74/0841 |
| 2018/0279149 | A1* | 9/2018 | Li ......................... H04L 5/0091 |
| 2019/0215870 | A1* | 7/2019 | Babaei .................. H04L 5/0092 |
| 2020/0119893 | A1* | 4/2020 | Zhang .............. H04W 72/0446 |
| 2020/0177336 | A1 | 6/2020 | Li |
| 2020/0186318 | A1 | 6/2020 | Miao et al. |

FOREIGN PATENT DOCUMENTS

| | | |
|---|---|---|
| CN | 107211296 A | 9/2017 |
| CN | 108809391 A | 11/2018 |
| CN | 109391986 A | 2/2019 |
| WO | 2015108636 A2 | 7/2015 |
| WO | 2017136292 A1 | 8/2017 |
| WO | 2019028832 A1 | 2/2019 |

OTHER PUBLICATIONS

"3rd Generation Partnership Project; Technical Specification Group Radio Access Network; Evolved Universal Terrestrial Radio Access (E-UTRA); Physical channels and modulation (Release 15)," 3GPP TS 36.211 V15.3.0, Sep. 2018, 237 pages.

"3rd Generation Partnership Project; Technical Specification Group Radio Access Network; Evolved Universal Terrestrial Radio Access (E-UTRA); Physical layer procedures (Release 12)," 3GPP TS 36.213 V12.13.0, Sep. 2018, 241 pages.

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.3.0, Sep. 2018, 127 pages.

"3rd Generation Partnership Project; Technical Specification Group Radio Access Network; NR; Requirements for support of radio resource management (Release 15)," 3GPP TS 38.133 V15.3.0, Sep. 2018, 136 pages.

"3rd Generation Partnership Project; Technical Specification Group Radio Access Network; NR; Physical channels and modulation (Release 15)," 3GPP TS 38.211 V15.3.0, Sep. 2018, 96 pages.

"3rd Generation Partnership Project; Technical Specification Group Radio Access Network; NR; Physical layer procedures for control (Release 15)," 3GPP TS 38.213 V15.3.0, Sep. 2018, 101 pages.

"3rd Generation Partnership Project; Technical Specification Group Radio Access Network; NR; Medium Access Control (MAC) protocol specification (Release 15)," 3GPP TS 38.321 V15.3.0, Sep. 2018, 76 pages.

"Delay reduction for SCell Activation," Agenda item: 9.9.2, Source: Huawei, HiSilicon, Document for: Discussion and decision, 3GPP TSG-RAN WG2 Meeting #99bis, R2-1711641, Revison of R2-1708550, Prague, Czech Republic, Oct. 9-13, 2017, 4 pages.

"Running CR for euCA Stage-2," Source to WG: Nokia, Nokia Shanghai Bell, Source to TSG: R2, Work item code: LTE_euCA-Core, Category: B, Date: Apr. 16, 2018, Release: Rel-15, 3GPP TSG-RAN WG2 Meeting #101, R2-1806788, R2-1806245, Sanya, China, Apr. 16-20, 2018, 9 pages.

"Fallback to Normal CQI Reporting Period," Agenda item: 9.9.2 (LTE_euCA-Core), Source: LG Electronics Inc., Document for: Discussion and Decision, 3GPP TSG-RAN2 Meeting #102, R2-1807952, Busan, Korea, May 21-25, 2018, 2 pages.

\* cited by examiner

CHANNEL MEASUREMENT METHOD AND APPARATUS

CROSS-REFERENCE TO RELATED APPLICATIONS

This application is a continuation of International Application No. PCT/CN2020/070362, filed on Jan. 4, 2020, which claims priority to Chinese Patent Application No. 201910028812.X, filed on Jan. 11, 2019. The disclosures of the aforementioned applications are hereby incorporated by reference in their entireties.

TECHNICAL FIELD

This application relates to the field of communications technologies, and in particular, to a channel measurement method and an apparatus.

BACKGROUND

In a wireless communications system, a network device and a terminal device may perform wireless communication based on various multiple access techniques, for example, code division multiple access (CDMA), time division multiple access (TDMA), frequency division multiple access (FDMA), orthogonal frequency division multiple access (OFDMA), single carrier frequency division multiple access (SC-FDMA), non-orthogonal multiple access (NOMA), or the like.

The network device may manage a cell. For example, one network device may manage one or more cells. The terminal device may communicate with the network device in a cell, and the cell may be referred to as a serving cell of the terminal device.

SUMMARY

Embodiments of this application are intended to provide a method, an apparatus, and a system for quick secondary cell activation.

According to a first aspect, an information measurement method is provided. The method includes receiving, from a network device, a configuration of a first channel state information reference signal (CSI-RS) resource periodicity and a configuration of a first channel state information (CSI) report periodicity that are of a secondary cell of a terminal device, where the first CSI-RS resource periodicity is used for receiving a first CSI-RS from the network device in a first time period, and the first CSI report periodicity is used for reporting CSI of the secondary cell to the network device in the first time period, and receiving, from the network device, a configuration of a second CSI-RS resource periodicity and a configuration of a second CSI report periodicity that are of the secondary cell of the terminal device, where the second CSI-RS resource periodicity is used for receiving a second CSI-RS from the network device in a second time period, and the second CSI report periodicity is used for reporting CSI of the secondary cell to the network device in the second time period.

The second time period is after the first time period.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

According to this method, after the secondary cell is activated, the network device can quickly obtain valid CSI of the secondary cell from the terminal, thereby implementing quick secondary cell activation.

In a possible design, that the first CSI-RS resource periodicity is used for receiving a first CSI-RS from the network device in a first time period includes the first CSI-RS resource periodicity is used for receiving the first CSI-RS from the network device in the first time period and in a first bandwidth part (BWP), where the first BWP is a BWP of the terminal device in the secondary cell. Optionally, the first BWP is preconfigured. Optionally, the method includes receiving a first indication from the network device, where the first indication is used to indicate the first BWP.

According to this method, in a system, for example, new radio (NR), that supports a BWP, the method provided in this embodiment of this application may be used. Therefore, in the system supporting the BWP, the network device can quickly obtain valid CSI of the secondary cell from the terminal, thereby implementing quick secondary cell activation.

In a possible design, the method includes reporting, starting from a time unit n+k, the CSI of the secondary cell to the network device based on the first CSI report periodicity, where the time unit n is a time unit in which an activation command is received, the activation command is used to activate the secondary cell for the terminal device, k is an integer greater than or equal to 0 and less than $k_1 + 3 \times N_{slot}^{subframe,\mu} + 1$, $k_1$ is a hybrid automatic repeat request (HARQ) feedback latency of a physical downlink shared channel (PDSCH), $N_{slot}^{subframe,\mu}$ is a quantity of slots included in a subframe of a frame structure numerology $\mu$, and $\mu$ is a frame structure numerology of an uplink channel used for reporting the CSI of the secondary cell.

According to this method, the terminal device can start reporting the CSI relatively early, so that the network device can quickly obtain valid CSI of the secondary cell from the terminal, thereby implementing quick secondary cell activation.

In a possible design, in the first time period, a physical downlink shared channel (PDSCH) and a physical downlink control channel (PDCCH) are not detected in the first BWP. According to this method, power consumption of the terminal in the first time period can be reduced.

In a possible design, the first time period is duration between a start of activation of the secondary cell and completion of the activation of the secondary cell, and the second time period is duration starting from the completion of the activation of the secondary cell.

In a possible design, the method includes reporting capability information to the network device, where the capability information is used to indicate whether the terminal device supports the method of quick secondary cell activation.

In a possible design, the method includes receiving a second indication from the network device, where the second indication is used to enable the method of quick secondary cell activation.

By using the foregoing method, the system can be compatible with various types of user equipment (UE). For example, the system is compatible with conventional UE that does not support the method of quick secondary cell activation, and is compatible with new UE that supports the method of quick secondary cell activation.

According to a second aspect, an information measurement method is provided. The method includes sending a configuration of a first channel state information reference signal (CSI-RS) resource periodicity and a configuration of a first channel state information (CSI) report periodicity that are of a secondary cell of a terminal device, where the first CSI-RS resource periodicity is used for sending a first CSI-RS in a first time period, and the first CSI report periodicity is used for receiving CSI of the secondary cell from the terminal device in the first time period, and sending a configuration of a second CSI-RS resource periodicity and a configuration of a second CSI report periodicity that are of the secondary cell of the terminal device, where the second CSI-RS resource periodicity is used for sending a second CSI-RS in a second time period, and the second CSI report periodicity is used for receiving CSI of the secondary cell from the terminal device in the second time period.

The second time period is after the first time period.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

In a possible design, that the first CSI-RS resource periodicity is used for sending a first CSI-RS in a first time period includes the first CSI-RS resource periodicity is used for sending the first CSI-RS in the first time period and in a first bandwidth part BWP, where the first BWP is a BWP of the terminal device in the secondary cell. Optionally, the first BWP is preconfigured. Optionally, the method includes sending a first indication to the terminal device, where the first indication is used to indicate the first BWP.

In a possible design, the method includes receiving, starting from a time unit n+k and based on the first CSI report periodicity, the CSI of the secondary cell reported by the terminal device, where the time unit n is a time unit in which an activation command is sent, the activation command is used to activate the secondary cell for the terminal device, k is an integer greater than or equal to 0 and less than $k_1+3\times N_{slot}^{subframe,\mu}+1$, $k_1$ is a hybrid automatic repeat request (HARQ) feedback latency of a physical downlink shared channel (PDSCH), slot is a quantity of slots included in a subframe of a frame structure numerology $\mu$, and $\mu$ is a frame structure numerology of an uplink channel used for receiving the CSI of the secondary cell.

In a possible design, in the first time period, a physical downlink shared channel (PDSCH) and a physical downlink control channel (PDCCH) are not sent in the first BWP.

In a possible design, the first time period is duration between a start of activation of the secondary cell and completion of the activation of the secondary cell, and the second time period is duration starting from the completion of the activation of the secondary cell.

In a possible design, the method includes receiving capability information from the terminal device, where the capability information is used to indicate whether the terminal device supports the method of quick secondary cell activation.

In a possible design, the method includes sending a second indication to the terminal device, where the second indication is used to enable the method of quick secondary cell activation.

According to a third aspect, an apparatus is provided. The apparatus may be a terminal device, an apparatus in a terminal device, or an apparatus that can be used together with a terminal device. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a processing module and a communications module. An example is described as follows.

The communications module is configured to receive, from a network device, a configuration of a first channel state information reference signal (CSI-RS) resource periodicity and a configuration of a first channel state information (CSI) report periodicity that are of a secondary cell of a terminal device, where the first CSI-RS resource periodicity is used for receiving a first CSI-RS from the network device in a first time period, and the first CSI report periodicity is used for reporting CSI of the secondary cell to the network device in the first time period.

The communications module receives, from the network device, a configuration of a second CSI-RS resource periodicity and a configuration of a second CSI report periodicity that are of the secondary cell of the terminal device, where the second CSI-RS resource periodicity is used for receiving a second CSI-RS from the network device in a second time period, and the second CSI report periodicity is used for reporting CSI of the secondary cell to the network device in the second time period.

The second time period is after the first time period.

Optionally, the processing module is configured to process (for example, demodulate and decode) the configuration of the first CSI-RS resource periodicity, the configuration of the first CSI report periodicity, the configuration of the second CSI-RS resource periodicity, and/or the configuration of the second CSI report periodicity.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

In a possible design, that the first CSI-RS resource periodicity is used for receiving a first CSI-RS from the network device in a first time period includes the first CSI-RS resource periodicity is used for receiving the first CSI-RS from the network device in the first time period and in a first bandwidth part BWP, where the first BWP is a BWP of the terminal device in the secondary cell. Optionally, the first BWP is preconfigured. Optionally, the communications module is configured to receive a first indication from the network device, where the first indication is used to indicate the first BWP.

In a possible design, the communications module is configured to report, starting from a time unit n+k, the CSI of the secondary cell to the network device based on the first CSI report periodicity, where the time unit n is a time unit in which an activation command is received, the activation command is used to activate the secondary cell for the terminal device, k is an integer greater than or equal to 0 and less than $k_1+3\times N_{slot}^{subframe,\mu}+1$, $k_1$ is a hybrid automatic repeat request (HARQ) feedback latency of a physical downlink shared channel (PDSCH), $N_{slot}^{subframe,\mu}$ is a quantity of slots included in a subframe of a frame structure numerology $\mu$, and $\mu$ is a frame structure numerology of an uplink channel used for reporting the CSI of the secondary cell. Optionally, the processing module is configured to generate the CSI.

In a possible design, in the first time period, the communications module does not detect, in the first BWP, a physical downlink shared channel (PDSCH) and a physical downlink control channel (PDCCH).

In a possible design, the first time period is duration between a start of activation of the secondary cell and completion of the activation of the secondary cell, and the second time period is duration starting from the completion of the activation of the secondary cell.

In a possible design, the processing module uses the communications module to report capability information to the network device, where the capability information is used to indicate whether the terminal device supports the method of quick secondary cell activation.

In a possible design, the processing module uses the communications module to receive a second indication from the network device, where the second indication is used to enable the method of quick secondary cell activation.

According to a fourth aspect, an apparatus is provided. The apparatus may be a network device, an apparatus in a network device, or an apparatus that can be used together with a network device. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a processing module and a communications module. An example is described as follows.

The communications module is configured to send a configuration of a first channel state information reference signal (CSI-RS) resource periodicity and a configuration of a first channel state information (CSI) report periodicity that are of a secondary cell of a terminal device, where the first CSI-RS resource periodicity is used for sending a first CSI-RS in a first time period, and the first CSI report periodicity is used for receiving CSI of the secondary cell from the terminal device in the first time period.

The communications module is configured to send a configuration of a second CSI-RS resource periodicity and a configuration of a second CSI report periodicity that are of the secondary cell of the terminal device, where the second CSI-RS resource periodicity is used for sending a second CSI-RS in a second time period, and the second CSI report periodicity is used for receiving CSI of the secondary cell from the terminal device in the second time period.

The second time period is after the first time period.

Optionally, the processing module is configured to generate the configuration of the first CSI-RS resource periodicity, the configuration of the first CSI report periodicity, the configuration of the second CSI-RS resource periodicity, and/or the configuration of the second CSI report periodicity.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

In a possible design, that the first CSI-RS resource periodicity is used for sending a first CSI-RS in a first time period includes the first CSI-RS resource periodicity is used for sending the first CSI-RS in the first time period and in a first bandwidth part BWP, where the first BWP is a BWP of the terminal device in the secondary cell. Optionally, the first BWP is preconfigured. Optionally, the communications module is configured to send a first indication to the terminal device, where the first indication is used to indicate the first BWP. The processing module is configured to generate the first indication.

In a possible design, the communications module is configured to receive, starting from a time unit n+k and based on the first CSI report periodicity, the CSI of the secondary cell reported by the terminal device, where the time unit n is a time unit in which an activation command is sent, the activation command is used to activate the secondary cell for the terminal device, k is an integer greater than or equal to 0 and less than $k_1 + 3 \times N_{slot}^{subframe,\mu} + 1$, $k_1$ is a hybrid automatic repeat request (HARQ) feedback latency of a physical downlink shared channel (PDSCH), $N_{slot}^{subframe,\mu}$ is a quantity of slots included in a subframe of a frame structure numerology $\mu$, and $\mu$ is a frame structure numerology of an uplink channel used for receiving the CSI of the secondary cell. The processing module is configured to process (for example, demodulate and decode) the CSI.

In a possible design, in the first time period, the communications module does not send, in the first BWP, a physical downlink shared channel (PDSCH) and a physical downlink control channel (PDCCH).

In a possible design, the first time period is duration between a start of activation of the secondary cell and completion of the activation of the secondary cell, and the second time period is duration starting from the completion of the activation of the secondary cell.

In a possible design, the communications module is configured to receive capability information from the terminal device, where the capability information is used to indicate whether the terminal device supports the method of quick secondary cell activation. The processing module is configured to process the capability information.

In a possible design, the communications module is configured to send a second indication to the terminal device, where the second indication is used to enable the method of quick secondary cell activation. The processing module is configured to generate the second indication.

According to a fifth aspect, an embodiment of this application provides an apparatus. The apparatus includes a processor, configured to implement the method described in the first aspect. The apparatus may further include a memory, configured to store instructions and data. The memory is coupled to the processor. When executing the instructions or the data stored in the memory, the processor can implement the method described in the first aspect. The apparatus may further include a communications interface. The communications interface is used by the apparatus to communicate with another device. For example, the communications interface may be a transceiver, a circuit, a bus, a module, or another type of communications interface, and the another device may be a network device. In a possible device, the apparatus includes the memory, configured to store program instructions, and the processor, configured to receive, through the communications interface from a network device, a configuration of a first channel state information reference signal (CSI-RS) resource periodicity and a configuration of a first channel state information (CSI) report periodicity that are of a secondary cell of a terminal device, where the first CSI-RS resource periodicity is used for receiving a first CSI-RS from the network device in a first time period, and the first CSI report periodicity is used for reporting CSI of the secondary cell to the network device in the first time period.

The processor is configured to receive, through the communications interface from the network device, a configuration of a second CSI-RS resource periodicity and a configuration of a second CSI report periodicity that are of the secondary cell of the terminal device, where the second CSI-RS resource periodicity is used for receiving a second CSI-RS from the network device in a second time period, and the second CSI report periodicity is used for reporting CSI of the secondary cell to the network device in the second time period.

The second time period is after the first time period.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

In a possible design, that the first CSI-RS resource periodicity is used for receiving a first CSI-RS from the network device in a first time period includes the first CSI-RS resource periodicity is used for receiving the first CSI-RS from the network device in the first time period and in a first bandwidth part BWP, where the first BWP is a BWP of the terminal device in the secondary cell. Optionally, the first BWP is preconfigured. Optionally, the processor is configured to receive, through the communications interface, a first indication from the network device, where the first indication is used to indicate the first BWP.

In a possible design, the processor is configured to report, through the communications interface, starting from a time unit n+k, the CSI of the secondary cell to the network device based on the first CSI report periodicity, where the time unit n is a time unit in which an activation command is received, the activation command is used to activate the secondary cell for the terminal device, k is an integer greater than or equal to 0 and less than $k_1+3 \times N_{slot}^{subframe,\mu}+1$, $k_1$ is a hybrid automatic repeat request (HARQ) feedback latency of a physical downlink shared channel (PDSCH), $N_{slot}^{subframe,\mu}$ is a quantity of slots included in a subframe of a frame structure numerology $\mu$, and $\mu$ is a frame structure numerology of an uplink channel used for reporting the CSI of the secondary cell.

In a possible design, in the first time period, the processor does not detect, through the communications interface, in the first BWP, a physical downlink shared channel (PDSCH) and a physical downlink control channel (PDCCH).

In a possible design, the first time period is duration between a start of activation of the secondary cell and completion of the activation of the secondary cell, and the second time period is duration starting from the completion of the activation of the secondary cell.

In a possible design, the processor is configured to report, through the communications interface, capability information to the network device, where the capability information is used to indicate whether the terminal device supports the method of quick secondary cell activation.

In a possible design, the processor is configured to receive, through the communications interface, a second indication from the network device, where the second indication is used to enable the method of quick secondary cell activation.

According to a sixth aspect, an embodiment of this application provides an apparatus. The apparatus includes a processor, configured to implement the method described in the second aspect. The apparatus may further include a memory, configured to store instructions and data. The memory is coupled to the processor. When executing the instructions or the data stored in the memory, the processor can implement the method described in the second aspect. The apparatus may further include a communications interface. The communications interface is used by the apparatus to communicate with another device. For example, the communications interface may be a transceiver, a circuit, a bus, a module, or another type of communications interface, and the another device may be a network device. In a possible device, the apparatus includes the memory, configured to store program instructions, and the processor, configured to send, through the communications interface, a configuration of a first channel state information reference signal (CSI-RS) resource periodicity and a configuration of a first channel state information (CSI) report periodicity that are of a secondary cell of a terminal device, where the first CSI-RS resource periodicity is used for sending a first CSI-RS in a first time period, and the first CSI report periodicity is used for receiving CSI of the secondary cell from the terminal device in the first time period.

The processor is configured to send, through the communications interface, a configuration of a second CSI-RS resource periodicity and a configuration of a second CSI report periodicity that are of the secondary cell of the terminal device, where the second CSI-RS resource periodicity is used for sending a second CSI-RS in a second time period, and the second CSI report periodicity is used for receiving CSI of the secondary cell from the terminal device in the second time period.

The second time period is after the first time period.

Optionally, the configuration of the first CSI-RS resource periodicity, the configuration of the first CSI report periodicity, the configuration of the second CSI-RS resource periodicity, and the configuration of the second CSI report periodicity are included in a same piece of signaling.

In a possible design, that the first CSI-RS resource periodicity is used for sending a first CSI-RS in a first time period includes the first CSI-RS resource periodicity is used for sending the first CSI-RS in the first time period and in a first bandwidth part BWP, where the first BWP is a BWP of the terminal device in the secondary cell. Optionally, the first BWP is preconfigured. Optionally, the processor is configured to send, through the communications interface, a first indication to the terminal device, where the first indication is used to indicate the first BWP.

In a possible design, the processor is configured to receive, through the communications interface, starting from a time unit n+k and based on the first CSI report periodicity, the CSI of the secondary cell reported by the terminal device, where the time unit n is a time unit in which an activation command is sent, the activation command is used to activate the secondary cell for the terminal device, k is an integer greater than or equal to 0 and less than $k_1+3 \times N_{slot}^{subframe,\mu}+1$, $k_1$ is a hybrid automatic repeat request (HARQ) feedback latency of a physical downlink shared channel (PDSCH), $N_{slot}^{subframe,\mu}$ is a quantity of slots included in a subframe of a frame structure numerology $\mu$, and $\mu$ is a frame structure numerology of an uplink channel used for receiving the CSI of the secondary cell. The processing module is configured to process (for example, demodulate and decode) the CSI.

In a possible design, in the first time period, the processor does not send, through the communications interface, in the first BWP, a physical downlink shared channel (PDSCH) and a physical downlink control channel (PDCCH).

In a possible design, the first time period is duration between a start of activation of the secondary cell and completion of the activation of the secondary cell, and the second time period is duration starting from the completion of the activation of the secondary cell.

In a possible design, the processor is configured to receive, through the communications interface, capability information from the terminal device, where the capability information is used to indicate whether the terminal device supports the method of quick secondary cell activation.

In a possible design, the processor is configured to send, through the communications interface, a second indication to the terminal device, where the second indication is used to enable the method of quick secondary cell activation.

According to a seventh aspect, an embodiment of this application further provides a computer-readable storage medium, including instructions. When the instructions are run on a computer, the computer is enabled to perform the method in the first aspect or the second aspect.

According to an eighth aspect, an embodiment of this application further provides a chip system. The chip system includes a processor, may further include a memory, and is configured to implement the method in the first aspect or the second aspect. The chip system may include a chip, or may include a chip and another discrete device.

According to a ninth aspect, an embodiment of this application further provides a computer program product including instructions. When the instructions are run on a computer, the computer is enabled to perform the method in the first aspect or the second aspect.

According to a tenth aspect, an embodiment of this application provides a system. The system includes the apparatus in the third aspect and the apparatus in the fourth aspect, or includes the apparatus according to the fifth aspect and the sixth aspect.

DETAILED DESCRIPTION OF ILLUSTRATIVE EMBODIMENTS

Figure 1:
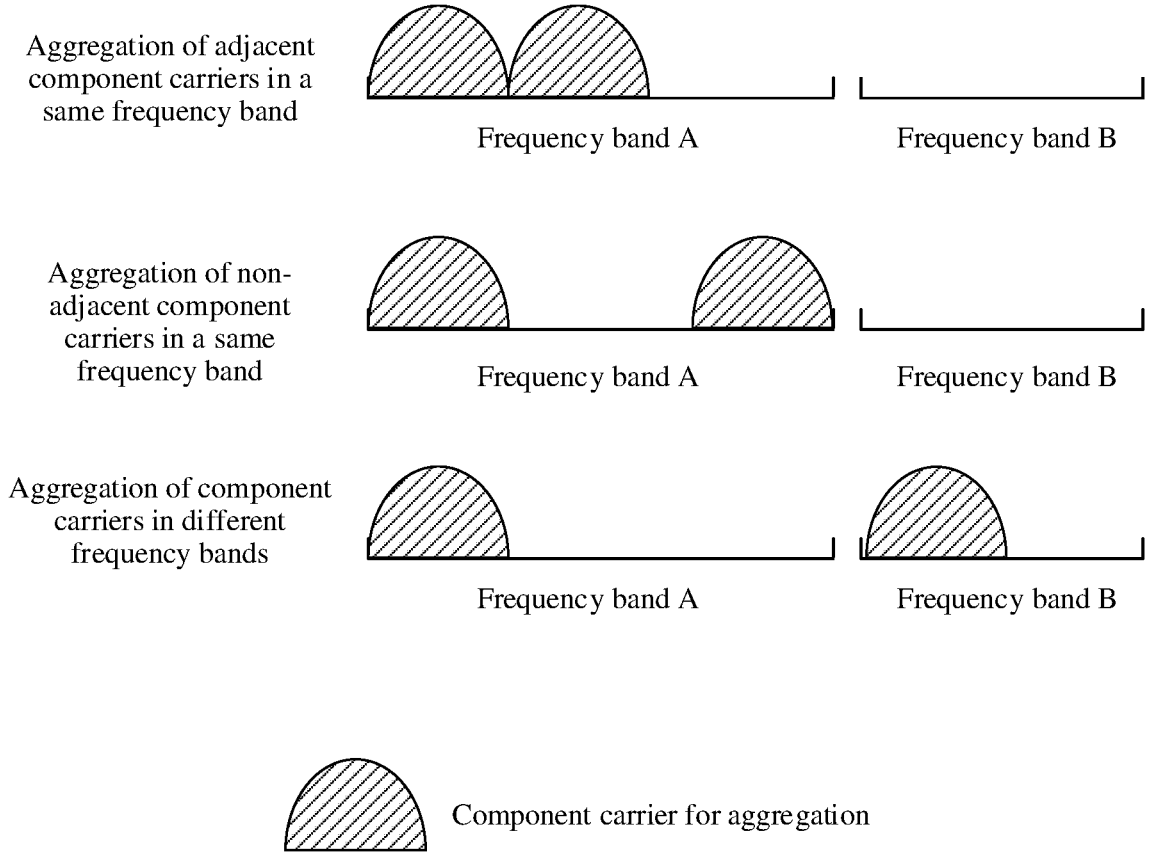
FIG. 1 is a schematic diagram of carrier aggregation according to an embodiment of this application.

The technical solutions provided in the embodiments of this application may be applied to various communications systems. For example, the technical solutions provided in the embodiments of this application may be applied to a communications system that supports carrier aggregation (CA), and/or may be applied to a communications system that supports channel state information (CSI) reporting. For example, the technical solutions provided in the embodiments of this application may be applied to but are not limited to being applied to a fifth generation (5G) mobile communications system, a long term evolution (LTE) system, or a future mobile communications system. 5G may also be referred to as new radio (NR).

In the embodiments of this application, a feature A and/or a feature B may refer to the feature A, the feature B, or the feature A and the feature B. Further, a feature A, a feature B, and/or a feature C (alternatively described as: a feature A, and/or a feature B, and/or a feature C) may refer to the feature A, the feature B, the feature C, the features A and B, the features A and C, the features B and C, or the features A, B and C.

In a communications system, the technical solutions provided in the embodiments of this application may be applied to wireless communication between communications devices. The communications device may include a network device and a terminal device. The wireless communication between communications devices may include wireless communication between the network device and the terminal device, wireless communication between network devices, and wireless communication between terminal devices. In the embodiments of this application, the term "wireless communication" may be referred to as "communication" for short, and the term "communication" may also be described as "data transmission", "signal transmission", "information transmission", "transmission", or the like. In the embodiments of this application, transmission may include sending or receiving. For example, the transmission may be uplink transmission. For example, the terminal device may send data to the network device. The transmission may alternatively be downlink transmission. For example, the network device may send data to the terminal device.

The terminal device in the embodiments of this application may be referred to as a terminal for short, and may be a device with a wireless transceiver function. The terminal may be deployed on land, including an indoor device, an outdoor device, a handheld device, or a vehicle-mounted device, may be deployed on a water surface (such as on a ship), or may be deployed in the air (for example, on an aircraft, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus for implementing a function of the terminal may be a terminal, or may be an apparatus that can support the terminal in implementing the function, for example, a chip system, and the apparatus may be mounted in the terminal. In the embodiments of this application, the chip system may include a chip, or may include a chip and another discrete device. In the technical solutions provided in the embodiments of this application, an example in which the apparatus for implementing the function of the terminal is a terminal and the terminal is UE is used to describe the technical solutions provided in the embodiments of this application.

The network device in the embodiments of this application includes a base station (BS), and the base station may be a device that is deployed in a radio access network and that can perform wireless communication with the terminal. The base station may be in a plurality of forms, for example, a macro base station, a micro base station, a relay node, and an access point. For example, the base station in the embodiments of this application may be a base station in 5G or a base station in LTE, and the base station in 5G may also be referred to as a transmission reception point (TRP) or a gNB (next generation NodeB). In the embodiments of this application, an apparatus for implementing a function of the network device may be a network device, or may be an apparatus that can support the network device in implementing the function, for example, a chip system, and the apparatus may be mounted in the network device. In the technical solutions provided in the embodiments of this application, an example in which the apparatus for implementing the function of the network device is a network device and the network device is a base station is used to describe the technical solutions provided in the embodiments of this application.

It should be noted that, although communication between the UE and the base station is used as an example for description in the embodiments of this application, the method provided in the embodiments may be further applied to wireless communication between other communications devices. For example, the method may be applied to communication between a macro base station and a micro base station. When the method is applied, a function of the macro base station in this scenario is equivalent to a function of the base station in the embodiments of this application, and a function of the micro base station in this scenario is equivalent to a function of the UE in the embodiments of this application.

In the communications system, to increase a data transmission rate, a carrier aggregation (CA) technology is proposed. A principle of the CA technology is to aggregate two or more component carriers (CC) to support a larger transmission bandwidth. One cell may include one downlink component carrier and one uplink component carrier, or one cell may include one downlink component carrier and two uplink component carriers, or one cell may include only one downlink component carrier. One downlink component carrier corresponds to one cell, and one downlink component carrier may be equivalent to one cell. To efficiently utilize fragmented frequency spectra, a plurality of types of carrier aggregation may be supported. For example, as shown in FIG. 1, aggregation of adjacent component carriers that are in a same frequency band may be supported. For example, in frequency domain, component carriers to be aggregated are adjacent in a frequency band A. Aggregation of non-adjacent component carriers in a same frequency band may be supported. For example, in frequency domain, component carriers to be aggregated are discrete or not adjacent in a frequency band A. Aggregation of component carriers in different frequency bands may be supported. For example, in frequency domain, component carriers to be aggregated are separately located in a frequency band A and a frequency band B. In CA, bandwidths of different component carriers for aggregation may be the same or may be different. This is not limited in this embodiment of this application.

In the CA technology, for one UE, a base station may configure one or more serving cells for the UE, and perform uplink and/or downlink data transmission with the UE in the serving cell. In the embodiments of this application, "a plurality of" may be two, three, four or more. This is not limited in the embodiments of this application. If the UE is in a radio resource control (RRC) connected (RRC_CONNECTED) mode but is not configured with CA, the UE may have only one serving cell. If the UE is in the RRC_CONNECTED mode and is configured with CA, the UE may have one or more serving cells.

In the CA technology, the serving cells configured by the base station for the UE may include one primary cell (PCell). A component carrier corresponding to the PCell may be referred to as a primary component carrier (PCC). A downlink (DL) component carrier of the PCell is referred to as a DL PCC, and an uplink (UL) component carrier of the PCell is referred to as a UL PCC. After the UE establishes an RRC connection to the base station, the UE has a PCell. For example, the PCell may be a cell accessed by the UE when the UE initially accesses the base station, or a cell accessed by the UE when the base station and the UE perform RRC connection reestablishment, or may be a primary cell notified by the base station to the UE in a cell handover process of the UE. The PCell is used for RRC communication between the base station and the UE.

In the CA technology, the serving cells configured by the base station for the UE may include one or more secondary cells (SCell). For example, in the serving cells configured by the base station for the UE, any serving cell other than the PCell is an SCell of the UE. A component carrier corresponding to the SCell is referred to as a secondary component carrier (SCC). A downlink component carrier of the SCell is referred to as a DL SCC, and an uplink component carrier of the SCell is referred to as a UL SCC. The SCell may be a serving cell added by the base station for the UE when the base station and the UE perform RRC connection reconfiguration, and is used to provide an additional radio resource. For example, after an initial security activation procedure, the base station may add, modify, or release an SCell through an RRC connection reconfiguration message for the UE. In the SCell, RRC communication may not be performed between the base station and the UE.

To better manage power consumption of UE configured with CA, an SCell activation/deactivation mechanism is proposed in the CA technology. Optionally, a state of the new SCell added or modified for the UE through the RRC connection reconfiguration message is a deactivated state.

After an SCell is configured for the UE, when the SCell is in an activated state or in an active BWP, the base station and the UE may perform uplink and/or downlink data transmission in the SCell, or when the SCell is in a deactivated state or in a deactivated BWP, the base station and the UE do not perform uplink and/or downlink data transmission in the SCell or the BWP. It should be noted that the activation/deactivation mechanism may not be supported for the PCell, and the PCell of the UE is always in an activated state. The base station and the UE may always perform data transmission in the PCell.

For example, when an SCell is in an activated state, the UE may perform one or more types of the following operations in a component carrier corresponding to the SCell: sending a channel sounding reference signal (SRS) to the base station, sending a physical uplink control channel (PUCCH) to the base station, sending a physical uplink shared channel (PUSCH) to the base station, reporting channel state information (CSI) to the base station, detecting a physical downlink control channel (PDCCH) from the base station, and receiving a physical downlink shared channel (PDSCH) from the base station. Optionally, when an SCell is in an activated state or in an active BWP, the UE may detect a PDCCH used for the SCell from the base station. The PDCCH may be used to carry scheduling information of a data channel, for example, scheduling information of a PDSCH and/or a PUSCH. When cross-carrier scheduling is configured for carrier aggregation, if a data channel of an SCell can be scheduled in another cell, the UE may receive a PDCCH used for the SCell from the base station in the another cell. The PDCCH is used to carry scheduling information of the data channel in the SCell. The another cell may be a PCell of the UE or another SCell of the UE.

In the embodiments of this application, "a plurality of types" may be two types, three types, four types, or more types. This is not limited in the embodiments of this application.

For example, when an SCell is in a deactivated state or a BWP is in a deactivated state, the UE does not perform one or more types of the following operations in a component carrier or a BWP corresponding to the SCell: skipping sending an SRS to the base station, skipping reporting CSI to the base station, skipping sending a PUCCH to the base station, skipping sending a PUSCH to the base station, skipping sending a physical random access channel (PRACH) to the base station, skipping detecting a PDCCH from the base station, and skipping receiving a PDSCH from the base station. Optionally, when an SCell is in a deactivated state, the UE may not detect a PDCCH used for the SCell from the base station.

SCell activation may be indicated by a media access control (MAC) control element (CE) sent by the base station. SCell deactivation may be indicated by a MAC CE sent by the base station, or may be implemented based on a deactivation timer. A value of the deactivation timer may be configured by the base station for the UE, or may be preconfigured, for example, preconfigured as a fixed value.

The base station may indicate, to the UE, an activated/deactivated state of one or more SCells of the UE by using the MAC CE. Activated/deactivated states of different SCells may be the same, or may be different. This is not limited in this embodiment of this application. The one or more SCells may be all SCells of the UE, or may be some SCells of the UE. This is not limited in this embodiment of this application.

For the SCell indicated to be in the activated state by using the MAC CE, the UE may deactivate the SCell based on the deactivation timer. For example, for an SCell of the UE, after determining, by using the MAC CE sent by the base station, that the SCell is in the activated state, the UE may start or restart the deactivation timer. Before the deactivation timer expires, if the UE receives a PDCCH used for the SCell from the base station, or if the UE receives, in the SCell, a PDCCH or a PDSCH from the base station, or if the UE sends a PUSCH to the base station, the UE starts or restarts the deactivation timer. If the deactivation timer expires, the UE deactivates the SCell.

After an SCell of the UE is activated, the UE may report CSI of the SCell to the base station, for the base station to perform downlink data scheduling, for example, for the base station to determine a transmission parameter of a PDSCH in the SCell. Optionally, the transmission parameter includes a modulation and coding scheme (MCS).

Figure 2:
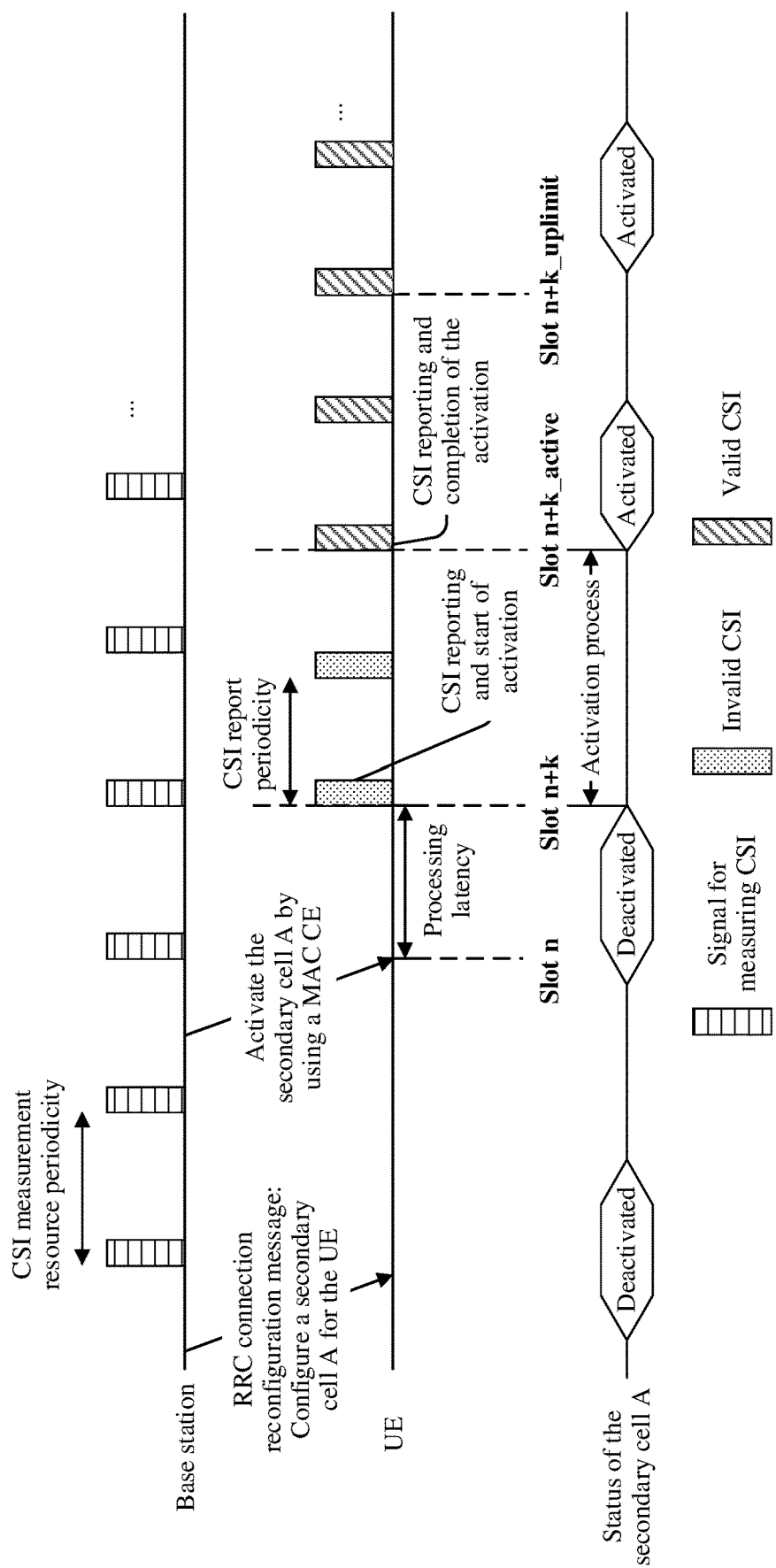
FIG. 2 and FIG. 4 are schematic diagrams of reporting CSI by a terminal to a network device according to an embodiment of this application.

FIG. 2 is an example diagram in which UE reports CSI to a base station in an SCell, for example, in a secondary cell A. As shown in FIG. 2, the base station configures (for example, adds or modifies) the new secondary cell A for the UE through an RRC connection reconfiguration message. Subsequently, the base station may send a MAC CE to the UE, and the MAC CE may be used to activate the secondary cell A for the UE. Optionally, the MAC CE may further indicate an activated/deactivated state of another secondary cell for the UE. After receiving the MAC CE in a time unit (for example, a subframe or a slot) n, the UE may process the MAC CE. For example, the UE may perform content parsing processing such as demodulation and decoding on the MAC CE. After the content parsing on the MAC CE is completed, the UE may further perform other operations such as radio frequency setup and baseband preparation. After completing the processing, the UE starts to activate the secondary cell A in a time unit (for example, a subframe or a slot) n+k. For example, the UE starts to report CSI of the secondary cell A to the base station in the time unit (for example, the subframe or the slot) n+k, and/or starts the deactivation timer for the secondary cell A. n and k are 0 or positive integers, and values of n and k may be the same or may be different. In the embodiments of this application, a positive integer may be 1, 2, 3, or greater. This is not limited in the embodiments of this application.

In the embodiments of this application, a time unit may be a frame, a subframe, a slot, a mini-slot, a time domain symbol, or the like. One frame may include one or more subframes. One frame or one subframe may include one or more slots. One frame, one subframe, one slot, or one mini-slot may include one or more time domain symbols. The time domain symbol may be referred to as a symbol for short. For example, the time domain symbol may be an OFDMA symbol or an SC-FDMA symbol.

In different communications systems, time units with a same physical meaning may have different names. For example, in a possible implementation, definitions of commonly used time units are shown in Table 1, Table 2, and Table 3. A frame structure numerology includes a subcarrier spacing and/or a cyclic prefix (CP) type. In Table 2 and Table 3, it is indicated by the frame structure numerology $\mu$ that a subcarrier spacing in the frame structure numerology is 15 kHz×$2^\mu$. A subcarrier may be a frequency domain resource unit in an OFDMA-based communications system, for example, in LTE or 5G. For different subcarrier spacings, for example, when a subcarrier spacing $\Delta f1$ is m times of another subcarrier spacing $\Delta f2$, that is, $\Delta f1 = m \times \Delta f2$, a sum of lengths of symbols corresponding to m $\Delta f2$ is equal to a length of a symbol corresponding to one $\Delta f1$.

TABLE 1

| Time unit | Length |
|---|---|
| Frame | 10 ms |
| Subframe | 1 ms |
| Slot | Time duration of a slot is related to the numerology. The time duration of the slot may be represented as a quantity of symbols included in the slot. For details, refer to Table 2 and Table 3. |

TABLE 2

| CP type: normal CP | | | |
|---|---|---|---|
| Frame structure numerology $\mu$ | Quantity of symbols included in each slot | Quantity of slots included in each frame | Quantity of slots included in each subframe |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| CP type: extended CP | | | |
|---|---|---|---|
| Frame structure numerology $\mu$ | Quantity of symbols included in each slot | Quantity of slots included in each frame | Quantity of slots included in each subframe |
| 2 | 12 | 40 | 4 |

As shown in FIG. 2, after configuring the secondary cell A for the UE, the base station may send, in the secondary cell A, based on a CSI measurement resource periodicity, a signal used for CSI measurement to the UE. The signal may be a synchronization signal block (SSB) or a channel state information reference signal (CSI-RS). The SSB may include one or more types of the following signals: a primary synchronization signal (PSS), a secondary synchronization signal (SSS), a physical broadcast channel (PBCH), and a demodulation reference signal (DMRS) of a PBCH. When the signal used for CSI measurement is the SSB, the base station sends, in the secondary cell A on a resource used for mapping the SSB, the SSB to the UE. The CSI measurement resource periodicity may also be referred to as an SSB resource periodicity, an SSB sending periodicity, or another name. This is not limited in this embodiment of this application. When the signal used for CSI measurement is the CSI-RS, the base station sends, in the secondary cell A on a resource used for mapping the CSI-RS, the CSI-RS to the UE. The CSI measurement resource periodicity may also be referred to as a CSI-RS resource periodicity, a CSI-RS sending periodicity, or another name. This is not limited in this embodiment of this application. Optionally, when the signal used for CSI measurement is the SSB, the base station may further configure, in the secondary cell A, an SSB measurement periodicity for the UE. The UE may measure, based on the SSB measurement periodicity, the SSB received from the base station, to estimate the CSI of the secondary cell A.

As shown in FIG. 2, after starting to activate the secondary cell A, the UE may report, starting from a time unit (for example, a subframe or a slot) n+k, the CSI of the secondary cell A to the base station based on a CSI report periodicity. The CSI is determined based on a signal that is received from the base station and that is used for CSI measurement. Optionally, the UE may report the CSI of the secondary cell A to the base station in a PCell or another secondary cell that is in the activated state.

In this embodiment of this application, the CSI may include one or more types of the following information: a channel quality indicator (CQI), a precoding matrix indicator (PMI), a CSI-RS resource indicator (CRI), an SSB/PBCH block resource indicator (SSBRI), a layer indicator (LI), a rank indicator (RI), and a layer 1 reference signal received power (L1-RSRP). A value of the CQI may be 0 or a positive integer, for example, any integer from 0 to 15. When a value of a CQI in the CSI reported by the UE to the base station is 0, the CSI may be considered as invalid CSI. When a value of a CQI in the CSI reported by the UE to the base station is not 0 or is greater than 0, the CSI may be considered as valid CSI.

As shown in FIG. 2, between a start of activation of the secondary cell A and completion of the activation of the secondary cell A, that is, in an activation process of the secondary cell A, the CSI reported by the UE to the base station is invalid CSI due to a processing latency and the like. After the completion of the activation of the secondary cell A, the UE starts to report valid CSI to the base station in a time unit (for example, a subframe or a slot) n+k_active. Optionally, if the UE starts to report the valid CSI of the secondary cell A to the base station, or the base station starts to receive the valid CSI of the secondary cell A, it is considered that the activation of the secondary cell A is completed. In this case, it may be considered that the secondary cell A is switched from the deactivated state to the activated state. For example, in FIG. 2, in the slot n+k_active, the secondary cell A is switched from the deactivated state to the activated state.

As described above, in the activation process of the secondary cell A, the base station cannot obtain valid CSI of the secondary cell A from the UE. Consequently, the base station cannot perform channel condition-based scheduling for the secondary cell A, and a transmission resource cannot be effectively used to increase a data transmission rate.

Based on the example shown in FIG. 2, the embodiments of this application provide a corresponding channel measurement method, an apparatus, and a system, to obtain valid CSI more quickly in an activation process of a secondary cell, thereby increasing a data transmission rate. The method may also be described as a method of quick secondary cell activation.

Figure 3:
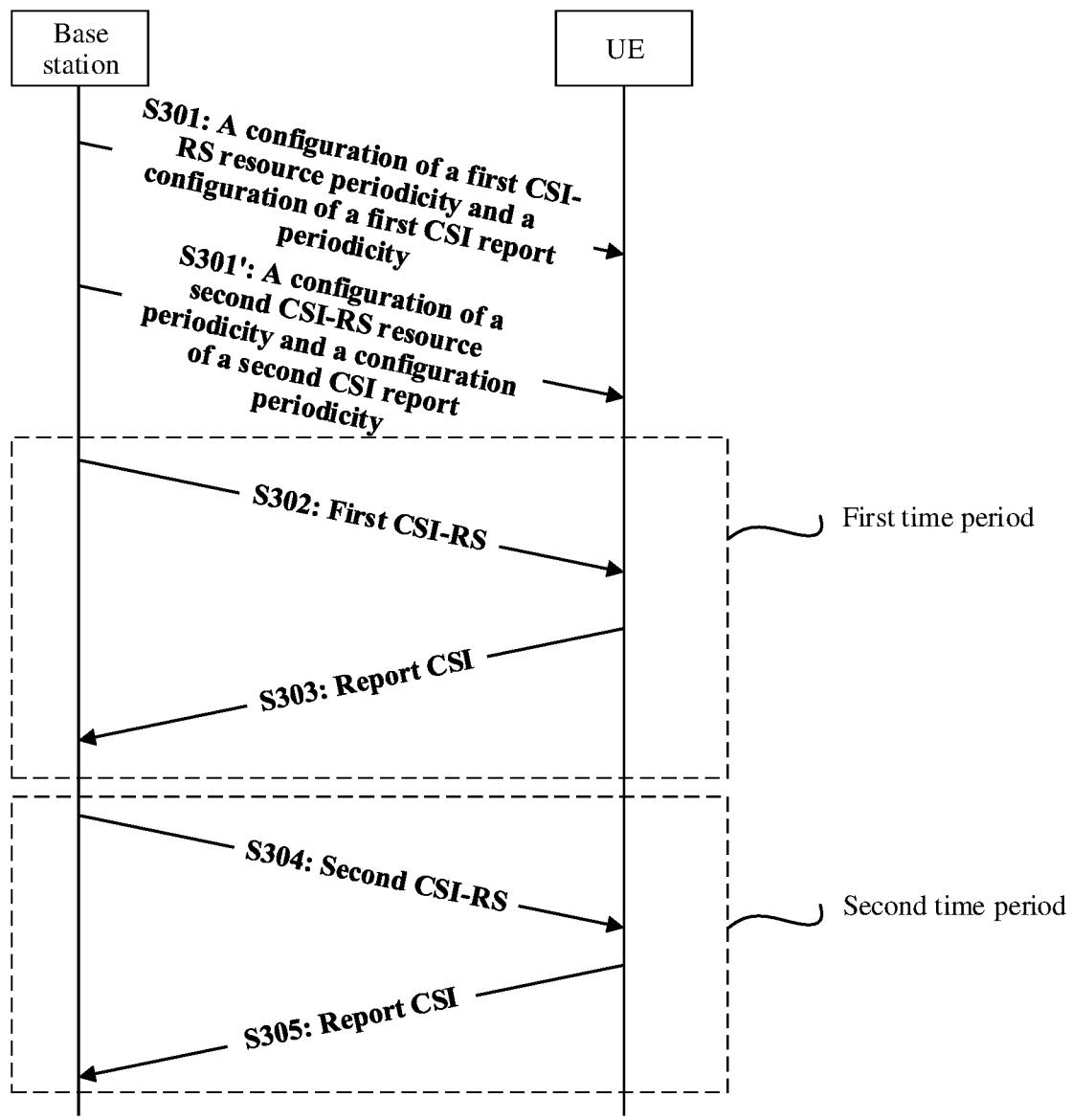
FIG. 3 is a schematic flowchart of an information measurement method according to an embodiment of this application.

FIG. 3 is a schematic flowchart of a channel measurement method according to an embodiment of this application. Based on FIG. 3, the first channel measurement method to the third channel measurement method according to this embodiment of this application may be shown in the following. The method shown in FIG. 3 may be a method for one secondary cell. For a plurality of secondary cells, channel measurement may be performed in each secondary cell by using the method shown in FIG. 3.

The first channel measurement method includes the following steps.

S301: A base station sends a configuration of a first CSI-RS resource periodicity of a secondary cell to UE. The first CSI-RS resource periodicity is used by the base station to send a first CSI-RS to the UE in a first time period.

The configuration of the first CSI-RS resource periodicity is used to indicate the first CSI-RS resource periodicity. The first CSI-RS resource periodicity may be referred to as a periodicity of a resource used for sending the first CSI-RS, a periodicity for sending the first CSI-RS, or a periodicity for transmitting the first CSI-RS.

In this embodiment of this application, a resource used for sending a CSI-RS may be a time-frequency resource, for example, may be one or more of the following resource types: a slot or a subframe used for sending the CSI-RS or a resource element (RE) used for sending the CSI-RS. Optionally, the UE may perform cell search based on the CSI-RS, and/or perform synchronization with the base station in a cell, and/or measure a channel quality of a cell.

For example, the first CSI-RS resource periodicity is used for periodically transmitting the first CSI-RS. The base station may configure the first CSI-RS resource periodicity to $N_{resource1}$ time units and a first CSI-RS resource offset to $offset_{resource1}$ time units for the UE. $N_{resource1}$ is a positive integer, and $offset_{resource1}$ is an integer ranging from 0 to $N_{resource}-1$. In this case, the base station may send the first CSI-RS to the UE in a $(offset_{resource1}+1)^{th}$ time unit in every $N_{resource1}$ time units. For example, the first CSI-RS resource periodicity configured by the base station for the UE is 20 slots, and the first CSI-RS resource offset is 5 slots. Indexes of the 20 slots in each periodicity are 0 to 19. In this case, the base station sends the first CSI-RS to the UE in the sixth slot in every 20 slots. To send the first CSI-RS, the base station may further configure a first CSI-RS pattern for the UE. The pattern is used to determine, in a time unit used for sending the first CSI-RS, an RE used for mapping a sequence of the first CSI-RS.

Optionally, in this embodiment of this application, the first time period may be a time period corresponding to an activation process of the secondary cell. In this embodiment of this application, the time period corresponding to the activation process of the secondary cell is duration between a start of activation of the secondary cell and completion of the activation of the secondary cell, for example, a time unit from the time unit n+k to a time unit that is before the time unit n+k_active shown in FIG. 2 or FIG. 4, that is, a time unit from the time unit n+k to a time unit n+k_active−1.

Figure 4:
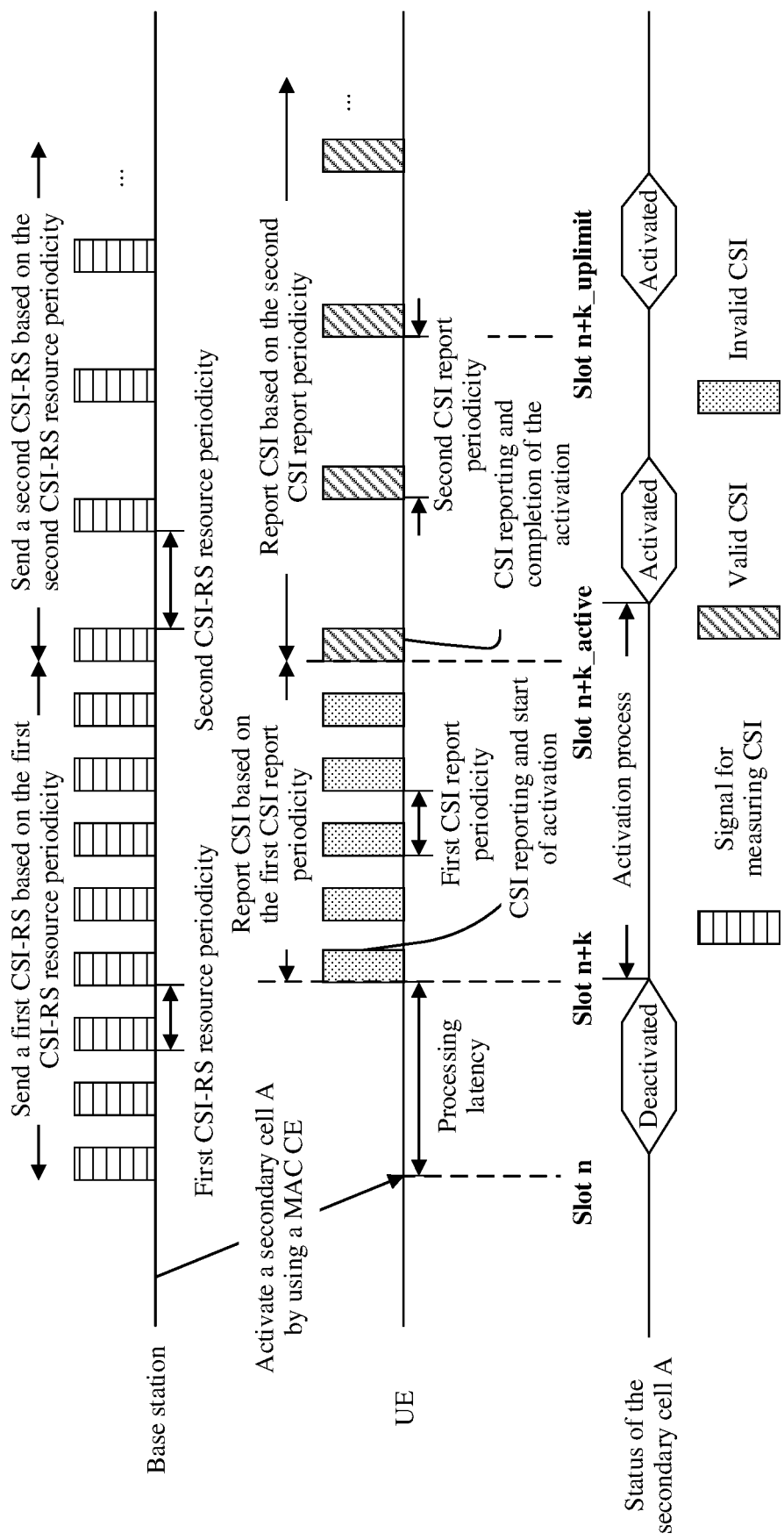

In this embodiment of this application, a time unit in which secondary cell activation is started is a time unit in which the UE may start to report the CSI to the base station, for example, the time unit n+k shown in FIG. 2 or FIG. 4. The time unit n+k is the time unit in which the UE may start to report the CSI. Actually, the UE may report the CSI in the time unit, or may report the CSI in a time unit after the time unit. For example, when the time unit n+k cannot be used for reporting the CSI, the UE may report the CSI in a time unit that is after n+k and that can be used for CSI reporting.

In this embodiment of this application, a time unit in which secondary cell activation is completed is a time unit in which the UE starts to report valid CSI to the base station. If the UE starts to report valid CSI of the secondary cell to the base station, or the base station starts to receive valid CSI of the secondary cell, it is considered that activation of the secondary cell is completed. In this case, it may be considered that the secondary cell is switched from the deactivated state to the activated state, and it may be considered that the time unit in which the secondary cell activation is completed is a time unit in which the secondary cell is switched from the deactivated state to the activated state.

In the method in FIG. 3, the secondary cell may be activated for the UE according to an activation command in a MAC CE, or may be activated by the base station for the UE by using an activation command in DCI, or may be activated by the base station for the UE by using RRC signaling. The method for activating the secondary cell by using the MAC CE has been described in detail in the method in FIG. 2. Details are not described herein again. When the secondary cell is activated for the UE by using the activation command in the DCI, the DCI may include an identifier that indicates the activated secondary cell. When the secondary cell is activated for the UE by using the RRC signaling, the RRC signaling may be the RRC connection reconfiguration message described in the method in FIG. 2. However, different from the method in FIG. 2, when the secondary cell is activated for the UE by using the RRC signaling, a secondary cell added or modified through the RRC connection reconfiguration message may be preconfigured to be activated, or the RRC connection reconfiguration message may indicate an activation status of the added or modified secondary cell, which is equivalent to that the RRC connection reconfiguration message includes indication information for secondary cell activation or an activation status of the secondary cell. A time at which the secondary cell starts to be activated may vary based on different manners of sending a secondary cell activation command. For example, when the DCI is used for cell activation, a time n+m1 at which the secondary cell activation is started is less than or equal to the time n+k at which the secondary cell activation is started when the activation command is sent by using the MAC CE, where m1 is 0 or a positive integer, and m1 is less than or equal to k. For example, when the RRC signaling is used for cell activation, a time n+m2 at which the secondary cell activation is started is greater than the time n+k at which the secondary cell activation is started when the activation command is sent by using the MAC CE, where m2 is a positive integer, and m2 is greater than k. For example, a value of m1 may be 0.5 ms, one or two symbols, or a corresponding quantity of slots, for example, $m1=0.5 \cdot N_{slot}^{subframe,\mu}$ or $m1=0.5 \cdot N_{slot}^{subframe,\mu}+1$. For example, $m2=16 N_{slot}^{subframe,\mu}+1$. A value of m2 may be 16 ms (millisecond) or a quantity of slots corresponding to 16 ms, for example, $m2=16 \cdot N_{slot}^{subframe,\mu}$ or $m2=16 \cdot N_{slot}^{subframe,\mu}+1$, where $N_{slot}^{subframe,\mu}$ is a quantity of slots included in a subframe. A frame structure numerology of the subframe is $\mu$, where $\mu$ is a frame structure numerology of an uplink channel used for reporting CSI of the secondary cell. The uplink channel may be a PUCCH or a PUSCH.

Optionally, in S302, in the first time period, the base station sends the first CSI-RS to the UE in the secondary cell based on the first CSI-RS resource periodicity.

In the method, the first CSI-RS resource periodicity used in the first time period is configured. For example, the first time period is a time period corresponding to a secondary cell activation process, so that an operation performed after the secondary cell activation is completed may not be considered in configuration of the periodicity. For example, a relatively short periodicity may be configured without considering resource overheads, so that when the UE reports CSI to the base station, the reported CSI is valid CSI. Therefore, the base station can quickly obtain valid CSI in the secondary cell activation process, to reduce a data transmission latency and increase a data transmission rate. The method may be applied to various application scenarios, and is especially applicable to a low-latency service.

For example, the first CSI-RS resource periodicity may be configured to be shorter than the CSI measurement resource periodicity in the method in FIG. 2. For example, because the CSI measurement resource periodicity in the method in FIG. 2 is used in the secondary cell activation process and after the secondary cell activation is completed, as resource overheads of a channel used for CSI measurement are considered, the CSI measurement resource periodicity in the method in FIG. 2 is configured to 60 ms, 40 ms, 20 ms, 10 ms, or the like. Because the first CSI-RS resource periodicity in the method in FIG. 3 may be used only in the first time period, and because duration of the first time period is far less than duration after the secondary cell activation is completed, resource overheads of the first CSI-RS may not be considered. In this case, the CSI measurement resource periodicity in the method in FIG. 3 is configured to 10 ms, 5 ms, 1 ms, 0.5 ms, or even shorter. The UE can receive a CSI-RS more quickly according to the method in FIG. 3 than according to the method in FIG. 2. Therefore, the UE can determine valid CSI more quickly. In addition, CSI that is more accurate and that better matches a PDSCH channel is obtained according to the method in FIG. 3 than according to the method in FIG. 2. Therefore, the data transmission rate can be further increased. In the method in FIG. 2, in the activation process of the secondary cell A, even if valid CSI is obtained, initially obtained valid CSI may be obtained through estimation based on an SSB received earlier, and is not accurate CSI, so that accurate PDSCH scheduling cannot be performed. A transmission channel of the SSB does not match a transmission channel of the PDSCH. For example, the SSB is a cell-level signal, a transmit beam of the SSB is wider, and the SSB is sent over a single-antenna port, and the PDSCH is a UE-level signal, a transmit beam of the PDSCH is narrower, and the PDSCH is sent over a single-antenna port or a multiple-antenna port. Consequently, in the method in FIG. 2, a latency between a time when the base station activates the secondary cell A and a time when the base station receives accurate CSI of the secondary cell A is relatively high. Based on the foregoing analysis, in the method in FIG. 3, the first CSI-RS resource periodicity used in the first time period is configured, so that the UE can receive the CSI-RS more quickly, and can quickly obtain the accurate CSI based on the CSI-RS. Therefore, a problem in the method in FIG. 2 is well resolved.

Optionally, in S301', the base station may send a configuration of a second CSI-RS resource periodicity of the secondary cell to the UE. The second CSI-RS resource periodicity is used by the base station to send a second CSI-RS to the UE in a second time period. The second time period is after the first time period.

Optionally, in S304, in the second time period, the base station sends the second CSI-RS to the UE in the secondary cell based on the second CSI-RS resource periodicity.

The configuration of the second CSI-RS resource periodicity is used to indicate the second CSI-RS resource periodicity. The second CSI-RS resource periodicity may be referred to as a periodicity of a resource used for sending the second CSI-RS, a periodicity for sending the second CSI-RS, or a periodicity for transmitting the second CSI-RS.

Similar to that in S301, the second CSI-RS resource periodicity is used for periodically transmitting the second CSI-RS. A method in which the base station sends the second CSI-RS to the UE by using the second CSI-RS resource periodicity is similar to a method in which the base station sends the first CSI-RS to the UE by using the first CSI-RS resource periodicity. For example, the base station may configure the second CSI-RS resource periodicity to $N_{resource2}$ time units and a second CSI-RS resource offset to $offset_{resource2}$ time units for the UE. $N_{resource2}$ is a positive integer, and $offset_{resource2}$ is an integer ranging from 0 to $N_{resource2}-1$. In this case, the base station may send the second CSI-RS to the UE in a $(offset_{resource2}+1)^{th}$ time unit in every $N_{resource2}$ time units.

Optionally, in this embodiment of this application, the second time period is duration starting from the completion of the activation of the secondary cell. For example, the second time period is duration between the completion of the activation of the secondary cell and next deactivation of the secondary cell, or the second time period is duration between the completion of the activation of the secondary cell and a release of the secondary cell.

In the method, optionally, the UE may report CSI to the base station. The CSI may be determined based on the first CSI-RS, or may be determined based on the SSB. The UE may report the CSI to the base station in the activation process, and/or may start to report the CSI to the base station after the completion of the activation. This is not limited in this embodiment of this application. When the UE reports the CSI to the base station, the reporting may be periodic, semi-static, or aperiodic. This is not limited in this embodiment of this application. For example, a method for reporting the CSI by the UE may be the method shown in FIG. 2, a CSI reporting method described in the following second channel measurement method, or a CSI reporting method described in LTE or NR. Details are not described herein again.

The second channel measurement method includes the following steps.

S301: A base station sends a configuration of a first CSI report periodicity to UE. The first CSI report periodicity is used by the UE to report CSI of the secondary cell to the base station in a first time period.

A description of the first time period is the same as that in the foregoing first channel measurement method. Details are not described herein again.

The configuration of the first CSI report periodicity is used to indicate the first CSI report periodicity. The first CSI report periodicity may be referred to as a periodicity for sending a CSI report in the first time period.

In this embodiment of this application, when reporting the CSI of the secondary cell to the base station, the UE may perform the reporting in a PCell of the UE, or may perform the reporting in another activated secondary cell. This is not limited in this embodiment of this application. When reporting the CSI to the base station, the UE may perform the reporting through a physical uplink shared channel (PUSCH), or may perform the reporting through a physical uplink control channel (PUCCH).

For example, the first CSI report periodicity is used for periodically reporting the CSI to the base station. The base station may configure the first CSI report periodicity to $N_{report1}$ time units and a first CSI report offset to $offset_{report1}$ time units for the UE. $N_{report1}$ is a positive integer, and $offset_{report1}$ is an integer ranging from 0 to $N_{report1}-1$. In this case, in the first time period, the UE may report the CSI of the secondary cell to the base station in a $(offset_{report1}+1)^{th}$ time unit in every $N_{report1}$ time units.

Optionally, in S303, in the first time period, the UE sends the CSI of the secondary cell to the base station based on the first CSI report periodicity.

In the method, the first CSI report periodicity used in the first time period, for example, in the secondary cell activation process, is configured, so that an operation performed after the secondary cell activation is completed may not be considered in configuration of the periodicity. For example, a relatively short periodicity may be configured without considering resource overheads, so that the CSI reported by the UE is valid CSI. Therefore, the base station can quickly obtain valid CSI in the secondary cell activation process, to reduce a data transmission latency and increase a data transmission rate. The method may be applied to various application scenarios, and is especially applicable to a low-latency service.

In this method, a shorter first CSI report periodicity may be configured for the UE, so that the UE has more opportunities to report CSI. Therefore, the base station can obtain valid or even accurate CSI more quickly. In this way, a transmission resource can be effectively used for data scheduling in the secondary cell, to increase a data transmission rate. For example, because the CSI report periodicity in the method in FIG. 2 is used in the secondary cell activation process and after the secondary cell activation is completed, as resource overheads of CSI reporting are considered, the CSI report periodicity in the method in FIG. 2 is configured to 100 ms, 60 ms, 40 ms, 20 ms, 10 ms, or the like. Because the first CSI report periodicity in the method in FIG. 3 is used only in the first time period, and because duration of the first time period is far less than duration after the secondary cell activation is completed, resource overheads of CSI reporting may not be considered. In this case, the CSI report periodicity in the method in FIG. 3 is configured to 20 ms, 10 ms, 5 ms, 1 ms, 0.5 ms, or even shorter. In the method in FIG. 2, even if the UE obtains valid or even accurate CSI, because the CSI report periodicity is relatively long, the CSI may not be reported to the base station. Consequently, the base station cannot effectively use a resource to increase a data transmission rate. However, in the method in FIG. 3, the CSI report periodicity used in the first time period may be independently configured, so that the CSI report periodicity may be configured to be shorter. In this case, after obtaining valid or even accurate CSI, the UE may report the valid or even accurate CSI to the base station in time. Therefore, the base station can effectively use a resource to increase a data transmission rate.

Optionally, in S301', the base station sends a configuration of a second CSI report periodicity to the UE. The second CSI report periodicity is used by the UE to report CSI of the secondary cell to the base station in a second time period.

A description of the second time period is the same as that in the foregoing first channel measurement method. Details are not described herein again.

The configuration of the second CSI report periodicity is used to indicate the second CSI report periodicity. The second CSI report periodicity may be referred to as a periodicity for sending a CSI report in the second time period.

For example, the second CSI report periodicity is used for periodically reporting the CSI to the base station in the second time period. The base station may configure the second CSI report periodicity to $N_{report2}$ time units and a second CSI report offset to $offset_{report2}$ time units for the UE. $N_{report2}$ is a positive integer, and $offset_{report2}$ is an integer ranging from 0 to $N_{report2}-1$. In this case, in the second time period, the UE may report the CSI of the secondary cell to the base station in a $(offset_{report2}+1)^{th}$ time unit in every $N_{report2}$ time units.

Optionally, in S305, the UE reports, based on the second CSI report periodicity, the CSI of the secondary cell to the base station in the second time period.

In the method, optionally, the base station may send a signal used for CSI measurement to the UE. For example, a method for sending the signal used for CSI measurement may be the method shown in FIG. 2, the method described in the first channel measurement method, or a CSI-RS sending method described in LTE or NR. Details are not described herein again.

The third channel measurement method includes the following steps.

S301: A base station sends a configuration of a first CSI-RS resource periodicity and a configuration of a first CSI report periodicity that are of a secondary cell to UE. The first CSI-RS resource periodicity is used by the base station to send a first CSI-RS to the UE in a first time period. The first CSI report periodicity is used by the UE to report CSI of the secondary cell to the base station in the first time period.

A description of the configuration of the first CSI-RS resource periodicity is the same as a corresponding description in the foregoing first channel measurement method. Details are not described herein again. A description of the configuration of the first CSI report periodicity is the same as a corresponding description in the foregoing second channel measurement method. Details are not described herein again.

Alternatively, the configuration of the first CSI-RS resource periodicity and/or the configuration of the first CSI report periodicity are preconfigured values. In this case, a difference from S301 is that signaling does not need to be sent from the base station to the UE to indicate a preconfigured parameter value.

Optionally, in S302, in the first time period, the base station sends the first CSI-RS to the UE in the secondary cell based on the first CSI-RS resource periodicity. This step is the same as a corresponding description in the first channel measurement method. Details are not described herein again.

Optionally, in S303, in the first time period, the UE sends the CSI of the secondary cell to the base station based on the first CSI report periodicity. This step is the same as a corresponding description in the second channel measurement method. Details are not described herein again.

Optionally, in S301', the base station sends a configuration of a second CSI-RS resource periodicity and a configuration of a second CSI report periodicity that are of the secondary cell to the UE. The second CSI-RS resource periodicity is used by the base station to send a second CSI-RS to the UE in a second time period. The second CSI report periodicity is used by the UE to report the CSI of the secondary cell to the base station in the second time period.

A description of the configuration of the second CSI-RS resource periodicity is the same as a corresponding description in the foregoing first channel measurement method. Details are not described herein again. A description of the configuration of the second CSI report periodicity is the same as a corresponding description in the foregoing second channel measurement method. Details are not described herein again.

Alternatively, the configuration of the second CSI-RS resource periodicity and/or the configuration of the second CSI report periodicity are preconfigured values. In this case, a difference from S301' is that signaling does not need to be sent from the base station to the UE to indicate a preconfigured parameter value.

Optionally, in S304, in the second time period, the base station sends the second CSI-RS to the UE in the secondary cell based on the second CSI-RS resource periodicity. This step is the same as a corresponding description in the first channel measurement method. Details are not described herein again.

Optionally, in S305, the UE reports, based on the second CSI report periodicity, the CSI of the secondary cell to the base station in the second time period. This step is the same as a corresponding description in the second channel measurement method. Details are not described herein again.

Optionally, in the method in FIG. 3, the configuration of the first CSI-RS resource periodicity of the secondary cell sent by the base station to the UE includes the configuration of the second CSI-RS resource periodicity of the secondary cell sent by the base station to the UE. The first CSI-RS resource periodicity is obtained based on the second CSI-RS resource periodicity. For example, the second CSI-RS resource periodicity is $N_{resource2}$ time units, and the second CSI-RS resource periodicity is $n1_{resource}$ times of the first CSI-RS resource periodicity. $n1_{resource}$ is greater than or equal to 1. For example, $n1_{resource}$ is 1.5, 2, 2.5, 3, 4, or a greater number. A value of $n1_{resource}$ may be predefined, or may be sent by the base station to the UE by using signaling.

Optionally, in the method in FIG. 3, the configuration of the second CSI-RS resource periodicity of the secondary cell sent by the base station to the UE includes the configuration of the first CSI-RS resource periodicity of the secondary cell sent by the base station to the UE. The second CSI-RS resource periodicity is obtained based on the first CSI-RS resource periodicity. For example, the first CSI-RS resource periodicity is $N_{resource1}$ time units, and the second CSI-RS resource periodicity is $n2_{resource}$ times of the first CSI-RS resource periodicity. $n2_{resource}$ is greater than or equal to 1. For example, $n2_{resource}$ is 1.5, 2, 2.5, 3, 4, or a greater number. A value of $n2_{resource}$ may be predefined, or may be sent by the base station to the UE by using signaling.

Optionally, in the method in FIG. 3, the configuration of the first CSI report periodicity of the secondary cell sent by the base station to the UE includes the configuration of the second CSI report periodicity of the secondary cell sent by the base station to the UE. The first CSI report periodicity is obtained based on the second CSI report periodicity. For example, the second CSI report periodicity is $N_{report2}$ time units, and the second CSI report periodicity is $n3_{resource}$ times of the first CSI report periodicity. $n3_{resource}$ is greater than or equal to 1. For example, $n3_{resource}$ is 1.5, 2, 2.5, 3, 4, or a greater number. A value of $n3_{resource}$ may be predefined, or may be sent by the base station to the UE by using signaling.

Optionally, in the method in FIG. 3, the configuration of the second CSI report periodicity of the secondary cell sent by the base station to the UE includes the configuration of the first CSI report periodicity of the secondary cell sent by the base station to the UE. The second CSI report periodicity is obtained based on the first CSI report periodicity. For example, the first CSI report periodicity is $N_{report1}$ time units, and the second CSI report periodicity is $n4_{resource}$ times of the first CSI report periodicity. $n4_{resource}$ is greater than or equal to 1. For example, $n4_{resource}$ is 1.5, 2, 2.5, 3, 4, or a greater number. A value of $n4_{resource}$ may be predefined, or may be sent by the base station to the UE by using signaling.

Optionally, in the method in FIG. 3, the first time period is from the time unit n+k to a time unit n+k+k_offset−1. The time unit n+k is a time unit (for example, that shown in FIG. 2 or FIG. 4) in which secondary cell activation is started, and k_offset is a positive integer, for example, 4, 6, 8, 12, or another integer. A value of k_offset may be preconfigured, or may be configured by the base station for the UE by using signaling. The second time period starts from a time unit n+k+k_offset. For example, the second time period is from the time unit n+k+k_offset to the last time unit before the secondary cell is deactivated, or from the time unit n+k+k_offset to the last time unit used before the secondary cell is released. Optionally, k+k_offset may be further represented as k2, and k2 is an integer greater than k. According to this method, a parameter value of each time period is independently configured, for example, a value of a CSI-RS resource periodicity and/or a value of a CSI report periodicity, and a smaller value may be configured for the first time period, so that there are more CSI-RS sending opportunities and/or CS reporting opportunities in the secondary cell activation process, thereby completing the secondary cell activation quickly. In the method, a length of the first time period may be greater than, equal to, or less than a length of a time period corresponding to the secondary cell activation process. This is not limited in this embodiment of this application.

In the embodiments of this application, a time sequence of the steps in the figures is not limited. In FIG. 3, for example, S301 and S301' may be performed simultaneously. For example, the base station sends the configuration of the first CSI-RS resource periodicity, the configuration of the first CSI report periodicity, the configuration of the second CSI-RS resource periodicity, and the configuration of the second CSI report periodicity to the UE in a same piece of signaling. For example, S301' may be performed after S302 or S303.

For example, the first time period is the time period corresponding to the secondary cell activation process. FIG. 4 is an example diagram of performing channel measurement according to the third channel measurement method. In FIG. 4 that is different from FIG. 2, after the base station activates the secondary cell A for the UE by using a MAC CE, in the activation process of the secondary cell A, the base station sends the first CSI-RS to the UE based on the first CSI-RS resource periodicity, so that the UE can quickly obtain accurate CSI of the secondary cell A, and the UE reports the accurate CSI of the secondary cell A to the base station based on the first CSI report periodicity, so that the base station can quickly obtain the accurate CSI of the secondary cell A. Therefore, accurate downlink scheduling can be performed on the secondary cell A. After the activation of the secondary cell A is completed, the base station sends the second CSI-RS to the UE based on the second CSI-RS resource periodicity. The UE reports the CSI of the secondary cell A to the base station based on the second CSI report periodicity. According to the method in FIG. 3, the first CSI-RS resource periodicity and the first CSI report periodicity that are used in a secondary cell activation process are independently configured, so that the two periodicities can be configured as short as possible. For example, the first CSI-RS resource periodicity and the first CSI report periodicity can respectively be shorter than the second CSI-RS resource periodicity and the second CSI report periodicity that are used after the secondary cell activation is completed, so that the base station can quickly obtain the accurate CSI of the secondary cell A in the secondary cell activation process. For example, in the method shown in FIG. 4, the base station may obtain the accurate CSI of the secondary cell A even in the time unit n+k, so that the base station can quickly complete accurate scheduling for the secondary cell.

For example, in the method in FIG. 2, the UE starts to activate the secondary cell A after the UE receives, in a subframe n by using a MAC CE, a command for activating the secondary cell A. For example, the UE starts to report the CSI of the secondary cell A to the base station in the time unit n+k, where a value of k is equal to $k_1+3\times N_{slot}^{subframe,\mu}+1$, $k_1$ is a hybrid automatic repeat request (HARQ) feedback latency of a physical downlink shared channel (PDSCH). $N_{slot}^{subframe,\mu}$ is a quantity of slots included in a subframe whose frame structure numerology is µ, and µ is the frame structure numerology of an uplink channel used for reporting the CSI of the secondary cell A.

However, in the method in FIG. 3, the UE starts to report the CSI of the secondary cell to the base station in the time unit n+k, where a time unit n is a time unit in which an activation command is received, the activation command is used to activate the secondary cell for the UE, k is an integer greater than or equal to 0 and less than $k_1+3\times N_{slot}^{subframe,\mu}+1$, $k_1$ is a hybrid automatic repeat request (HARQ) feedback latency of a PDSCH, slot is a quantity of slots included in a subframe, a frame structure numerology of the subframe is µ, and µ is the frame structure numerology of an uplink channel used for reporting the CSI of the secondary cell. For example, k is $k_1+3\times N_{slot}^{subframe,\mu}+1$, k is $k_1+1\times N_{slot}^{subframe,\mu}$, or k is a time unit corresponding to Ni symbols, where Ni indicates a time for the terminal device to process a physical downlink shared channel (PDSCH). The PDSCH processing time of the terminal device is duration between the last symbol on which the terminal device receives the PDSCH and the $1^{st}$ uplink symbol on which the terminal device receives a physical channel carrying hybrid automatic repeat request (HARQ) feedback information. The HARQ feedback information is valid HARQ feedback information. A HARQ feedback may include a correct receiving acknowledgment feedback or an incorrect receiving acknowledgment feedback. The correct receiving acknowledgment feedback may be represented by an ACK, and the incorrect receiving acknowledgment feedback may be represented by a NACK. The PDSCH processing time of the terminal device may be measured in a unit of symbols. For example, k is a time unit corresponding to the Ni symbols plus a time unit corresponding to 1 ms. When being added, the time unit corresponding to the Ni symbols and the time unit corresponding to 1 ms need to be unified by using a same time unit such as a slot. $k=\lceil T_{symbols}/N_{symbol}^{slot}\rceil$, where $T_{symbols}$ represents a quantity of symbols. A reason for selecting these k values includes that the secondary cell activation can be started before the UE feeds back a HARQ to the base station, or that a processing time of the UE is not based on the network configuration but based on a processing capability of the UE, because the worst processing capability of the UE is usually configured on a network side, that the UE may simultaneously process signaling parsing and feed back HARQ information, thereby shortening a time, that a time for the UE to process signaling parsing and radio frequency or baseband preparation is less than 3 ms, and the like.

The HARQ feedback latency of the PDSCH may be a preconfigured value such as a positive integer quantity of subframes or slots, for example, four. Alternatively, the HARQ feedback latency of the PDSCH may be indicated by the base station to the UE by using signaling (for example, DCI). Alternatively, the HARQ feedback latency of the PDSCH may be indicated by the base station to the UE by using both RRC signaling and DCI, where the RRC signaling is used to configure a candidate value set of the HARQ feedback latency of the PDSCH, and the DCI is used to indicate, in the candidate set, a specific HARQ feedback latency that is of the PDSCH and that is configured for the UE.

Similar to the foregoing analysis, by comparing n+k in the methods in FIG. 2 and FIG. 3, it can be learned that, according to the method provided in this embodiment of this application, the base station can quickly complete accurate scheduling of the secondary cell, so that a data transmission rate can be increased.

In the method in FIG. 3, the UE may report the CSI of the secondary cell in a primary cell or in another secondary cell. When the CSI of the secondary cell is reported, the CSI may be reported through a PUCCH or a PUSCH. When the CSI is reported through the PUCCH, $\mu$ in $k_1+3\times N_{slot}^{subframe,\mu}+1$ is a frame structure numerology of the PUCCH. When the CSI is reported through the PUSCH, $\mu$ in $k_1+3\times N_{slot}^{subframe,\mu}+1$ is a frame structure numerology of the PUSCH.

In the methods/method in FIG. 2 and/or FIG. 3, starting reporting CSI and starting a secondary cell deactivation timer need to be performed in the time unit n+k. In addition, other MAC layer processing, for example, scheduling of a PDSCH and/or a PUSCH and sending of a PRACH, needs to be performed not earlier than the time unit n+k and not later than a time unit n+k_uplimit, where k_uplimit is 0 or a positive integer. In this embodiment of this application, a time at which the secondary cell activation is completed may alternatively be a time at which cell search, automatic gain control, frequency or time synchronization, frequency or time tracking, CSI processing, or the like may be performed.

In the method in FIG. 3, a unit of the first CSI-RS resource periodicity, the second CSI-RS resource periodicity, the first CSI report periodicity, and/or the second CSI report periodicity may be an absolute time, for example, 10 ms, 5 ms, 1 ms, or 0.5 ms. Alternatively, a unit of the first CSI-RS resource periodicity, the second CSI-RS resource periodicity, the first CSI report periodicity, and/or the second CSI report periodicity may be a time unit. For example, an integer quantity of slots or subframes may be configured.

In the method in FIG. 3, in a possible implementation, the first CSI-RS resource periodicity is used by the base station to send the first CSI-RS to the UE in the first time period and in the first bandwidth part (BWP) of the secondary cell. Correspondingly, the first CSI-RS resource periodicity is used by the UE to receive the first CSI-RS of the UE from the base station in the first time period and in the first BWP of the secondary cell. The first BWP is a BWP configured by the base station for the UE in the secondary cell.

In this embodiment of this application, signaling may be semi-static signaling and/or dynamic signaling. The semi-static signaling may be radio resource control (RRC) signaling, a broadcast message, a system message, or a MAC control element (CE). The broadcast message may include remaining minimum system information (RMSI). The dynamic signaling may be physical layer signaling. The physical layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type communication physical downlink control channel (MPDCCH). Signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

In this embodiment of this application, a BWP may also be referred to as a carrier bandwidth part. In frequency domain, one BWP includes a positive integer quantity of consecutive resource elements, for example, includes a positive integer quantity of consecutive subcarriers, resource blocks (RB), or resource block groups (RB group, RBG). One RB includes a positive integer quantity of subcarriers, for example, 12. One RBG includes a positive integer quantity of RBs, for example, four or eight. The BWP may be a downlink BWP or an uplink BWP. The uplink BWP is used by the UE to send a signal to the base station, and the downlink BWP is used by the base station to send a signal to the UE.

In a cell, the base station may configure one or more BWPs for uplink or downlink of the UE. For example, a maximum of four BWPs are configured for the uplink and a maximum of four BWPs are configured for the downlink. A quantity of BWPs configured for the uplink and a quantity of BWPs configured for the downlink may be the same or different. The one or more BWPs configured by the base station for the UE may be referred to as a configuration BWP of the UE. For example, one or more uplink BWPs configured by the base station for the UE may be referred to as an uplink configuration BWP of the UE, and one or more downlink BWPs configured by the base station for the UE may be referred to as a downlink configuration BWP of the UE. For each BWP, a numerology of the BWP may be independently configured through pre-configuration or through sending signaling by the base station to the UE. Numerologies of different BWPs may be the same or different.

In uplink and/or downlink, the base station may activate only one BWP in the configuration BWP of the UE for the UE, and the UE and the base station may perform data transmitting and receiving only in the active BWP. For example, the UE sends a physical uplink control channel (PUCCH) and/or a physical uplink shared channel (PUSCH) to the base station only in an active uplink BWP, and the base station sends a PDCCH and/or a PDSCH to the UE only in an active downlink BWP.

As described above, optionally, the first CSI-RS resource periodicity is used by the base station to send the first CSI-RS to the UE in the first time period and in the first bandwidth part (BWP) of the secondary cell. The first BWP may be preconfigured or indicated by the base station for the UE by using signaling.

Optionally, the first BWP is a BWP used by the UE to access the base station in the secondary cell. For example, the BWP is a BWP used for receiving a random access response (RAR) from the base station in a process in which the UE accesses the base station. The BWP may be referred to as an initial downlink BWP or another name.

Optionally, the first BWP is a BWP used by the UE to receive an SSB in the secondary cell. The BWP may be referred to as an initial downlink BWP or another name.

Optionally, the first BWP is any BWP in the downlink configuration BWP of the UE in the secondary cell. For example, the BWP may be a BWP whose index is 0 or the $1^{st}$ BWP in the downlink configuration BWP of the UE.

Optionally, the first BWP is a first downlink activation BWP of the UE in the secondary cell. For example, when or after configuring the downlink configuration BWP of the UE for the UE in the secondary cell, the base station may configure one downlink BWP in the downlink configuration BWP of the UE as the first downlink activation BWP of the UE. The first downlink activation BWP may be a downlink BWP that is in the downlink configuration BWP of the UE and that is activated for the first time after the UE accesses the base station in the secondary cell or after the UE is handed over to the secondary cell. The first downlink activation BWP may also be referred to as an initial activation BWP, a first operating BWP, an initial operating BWP, or another name. This is not limited in this embodiment of this application. The first downlink activation BWP may be the first BWP.

Optionally, the base station may send a first indication to the UE, where the first indication is used to indicate the first BWP. A signaling form of the first indication may be any of the foregoing signaling types. This is not limited in this embodiment of this application.

For example, the base station may indicate, by using the first indication, one or more of the following information of the first BWP: an identifier of the first BWP and a resource location (for example, a start location and a bandwidth) of the first BWP. The start location of the first BWP may be a location of a start RB in the first BWP.

For example, when the base station configures the downlink configuration BWP of the UE for the UE in the secondary cell, or after the base station configures the downlink configuration BWP of the UE for the UE in the secondary cell, the base station may send the first indication to the UE, to indicate an index of the first BWP in the downlink configuration BWP of the UE. For example, the downlink configuration BWP of the UE includes three BWPs, namely, a BWP 0, a BWP 1, and a BWP 2. In this case, the first indication may include $\log_2(3)=2$ bits. When a value of the two bits is 00, the first BWP is the BWP 0. When a value of the two bits is 01, the first BWP is the BWP 1. When a value of the two bits is 10, the first BWP is the BWP 2.

Optionally, the second CSI-RS resource periodicity is used by the base station to send the second CSI-RS to the UE in the second time period and in a second BWP of the secondary cell. The second BWP may be the first BWP. The second BWP may also be preconfigured or indicated by the base station for the UE by using signaling. A method for preconfiguring the second BWP or indicating the second BWP by using signaling is similar to the foregoing described method for configuring the first BWP. Details are not described herein again. A manner of configuring the first BWP and a manner of configuring the second BWP may be the same or may be different. This is not limited in this embodiment of this application.

Optionally, the base station may configure the first CSI-RS resource periodicity for the UE in the signaling used for configuring the first BWP, that is, the signaling used for configuring the first BWP includes the first CSI-RS resource periodicity configuration, and/or the base station may configure the first CSI report periodicity for the UE in the signaling used for configuring the first BWP, that is, the signaling used for configuring the first BWP includes the first CSI report periodicity configuration. Similarly, the base station may configure the second CSI-RS resource periodicity for the UE in the signaling used for configuring the second BWP, and/or the base station may configure the second CSI report periodicity for the UE in the signaling used for configuring the second BWP. Signaling used for configuring a BWP may be used to indicate one or more of the following information of the BWP: a start location, a bandwidth, a subcarrier spacing, and a cyclic prefix type. A type of the signaling used for configuring the BWP may be RRC signaling, a MAC CE, or another form of signaling. This is not limited in this embodiment of this application.

Optionally, in the following signaling formats, the base station may configure the first CSI-RS resource periodicity and/or the first CSI report periodicity for the UE in a CSI measurement configuration message CSI-MeasConfig, or the CSI measurement configuration message includes the first CSI-RS resource periodicity configuration and/or the first CSI report periodicity configuration. Optionally, the CSI measurement configuration message CSI-MeasConfig may further include the second CSI-RS resource periodicity configuration and/or the second CSI report periodicity configuration. A signaling type of the CSI measurement configuration message CSI-MeasConfig may be a system message, a broadcast message, RRC signaling, a MAC CE, or another signaling form. This is not limited in this embodiment of this application.

For example, the CSI measurement configuration message CSI-MeasConfig includes one or more of the following information elements: an information element of the first CSI-RS resource periodicity configuration, an information element of the first CSI report periodicity configuration, an information element of the second CSI-RS resource periodicity configuration, an information element of the second CSI report periodicity configuration, and an identifier (ID) or an index of the first BWP.

Figure 5A:
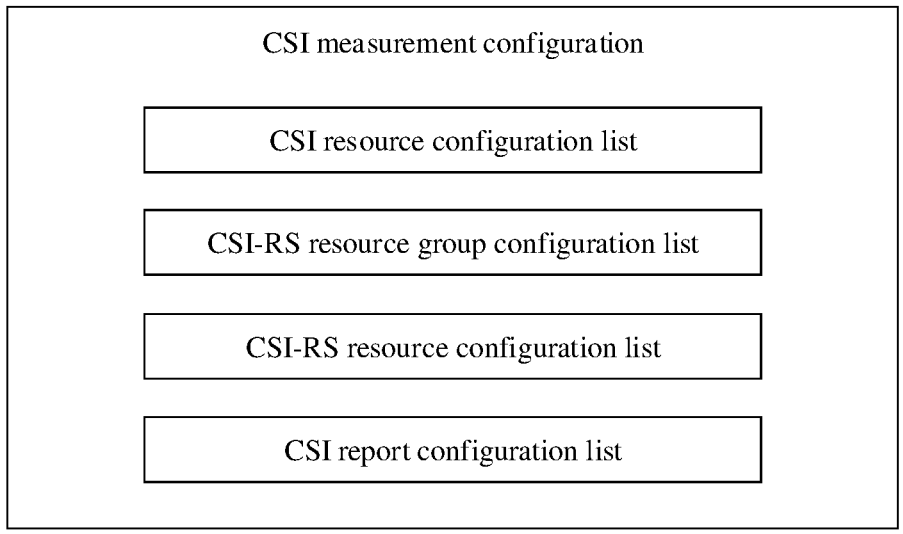
FIG. 5 (including FIG. 5a to FIG. 5e) is a schematic structural diagram of a message according to an embodiment of this application.

FIG. 5 (including FIG. 5a to FIG. 5e) is a schematic structural diagram of a CSI measurement configuration message CSI-MeasConfig. As shown in FIG. 5a, the CSI measurement configuration message may include a CSI resource configuration list, and the list includes one or more CSI resource configurations. The CSI measurement configuration message may include a CSI-RS resource group configuration list, and the list includes one or more CSI-RS resource group configurations. The CSI measurement configuration message may include a CSI-RS resource configuration list, and the list includes one or more CSI-RS resource configurations. The CSI measurement configuration message may include a CSI report configuration list, and the CSI report configuration list includes one or more CSI report configurations.

Figure 5B:
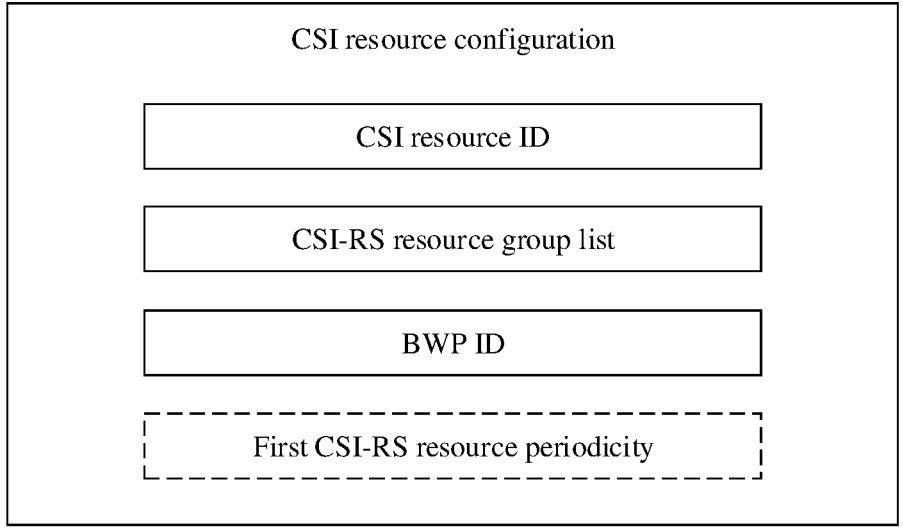

As shown in FIG. 5b, one CSI resource configuration may include a CSI resource identifier (ID), may include a CSI-RS resource group list, where the list is used to associate one or more CSI-RS resource groups, and for example, the list includes respective IDs of the one or more CSI-RS resource groups, or may include a BWP ID, used to associate a BWP in which the CSI resource configuration is used. Optionally, the CSI resource configuration may include a first CSI-RS resource periodicity associated with the CSI resource configuration.

Figure 5C:
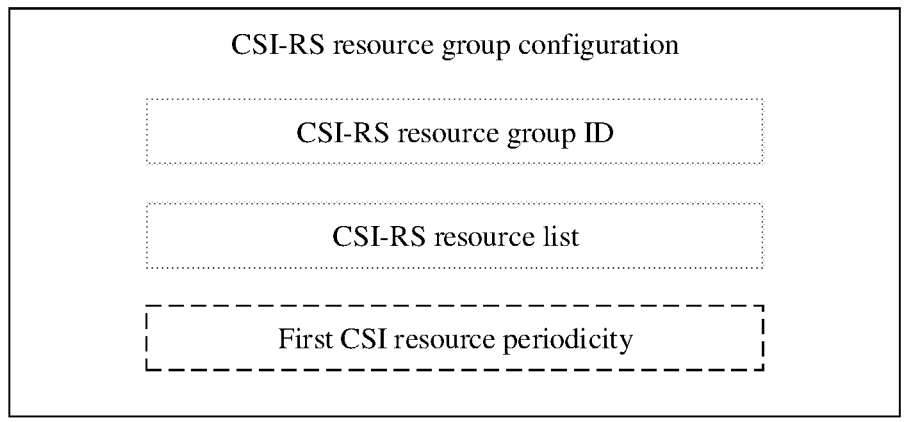

As shown in FIG. 5c, one CSI-RS resource group configuration may include a CSI-RS resource group ID, and may include a CSI-RS resource list, where the list is used for associating one or more CSI-RS resources, for example, includes respective IDs of the one or more CSI-RS resources. Optionally, the CSI-RS resource group configuration may include a first CSI-RS resource periodicity associated with the CSI-RS resource group.

Figure 5D:
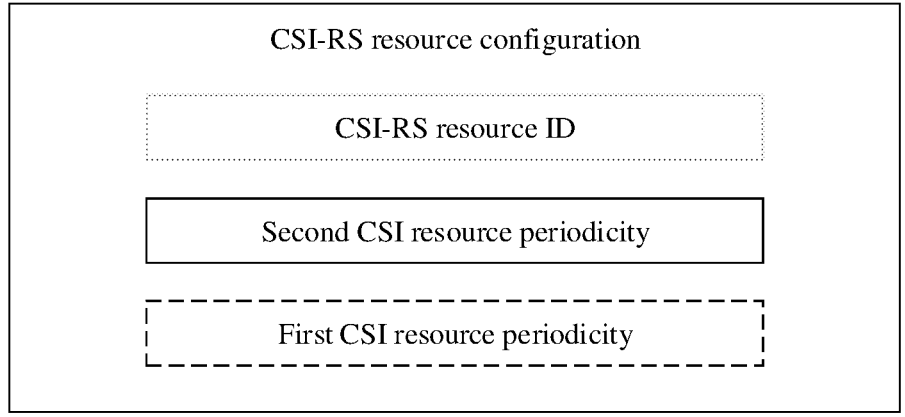

As shown in FIG. 5d, one CSI-RS resource configuration may include a CSI-RS resource ID, and may include a second CSI-RS resource periodicity associated with the CSI-RS resource. Optionally, the CSI-RS resource configuration may include a first CSI-RS resource periodicity associated with the CSI-RS resource.

Figure 5E:
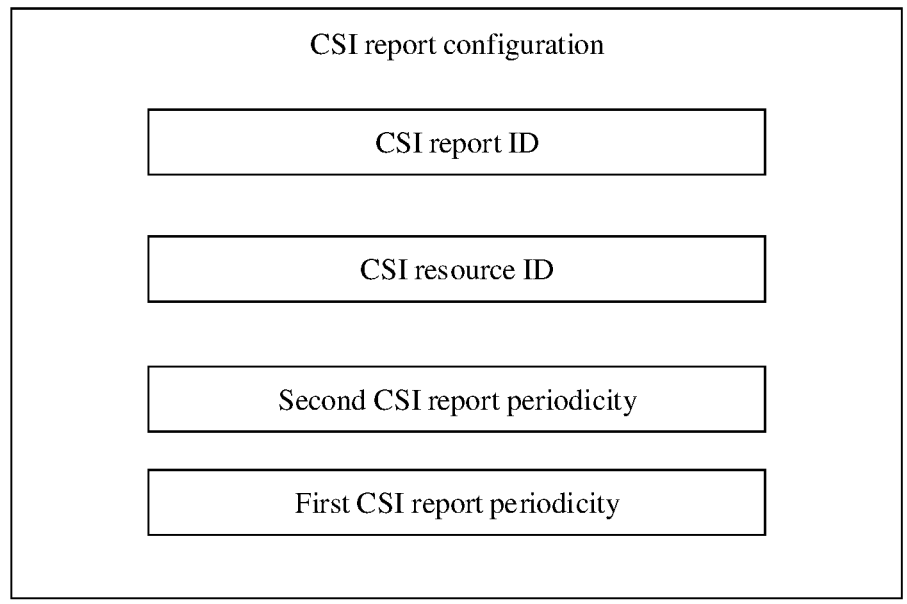

As shown in FIG. 5e, one CSI report configuration may include a CSI report ID, may include an ID of a CSI resource associated with the CSI report, and may include a first CSI report periodicity and a second CSI report periodicity that are associated with the CSI report.

In a possible implementation, in the method in FIG. 3, in the secondary cell activation process, the base station does not send a PDSCH to the UE in the secondary cell, and/or does not send a PDCCH to the UE in the secondary cell, and/or does not receive a PUCCH from the UE in the secondary cell, and/or does not receive a PUSCH from the UE in the secondary cell. Correspondingly, the UE does not detect, in the secondary cell, the PDCCH sent by the base station, and/or does not receive, in the secondary cell, the PDCCH sent by the base station, and/or does not send the PUCCH to the base station in the secondary cell, and/or does not send the PUSCH to the base station in the secondary cell. For example, in the secondary cell activation process, the base station does not send the PDCCH and/or the PDSCH to the UE in a first BWP of the secondary cell.

Optionally, in the method in FIG. 3, the UE may report a first capability to the base station, where the first capability is used to indicate that the UE supports quick secondary cell activation, or is used to indicate the UE does not support quick secondary cell activation. If it is indicated by the first capability that the UE supports quick secondary cell activation, the UE may support the method in FIG. 3. If it is indicated by the first capability that the UE does not support quick secondary cell activation, the UE may support the method in FIG. 2, or perform a method related to CSI-RS sending and/or CSI reporting in existing LTE or NR.

Optionally, the base station may send a second indication to the UE, where the second indication is used to indicate whether to enable (or start) quick secondary cell activation. If quick secondary cell activation is started, the UE and the base station perform the method in FIG. 3. If quick secondary cell activation is not started, the UE and the base station perform the method in FIG. 2, or perform the method related to CSI-RS sending and/or CSI reporting in existing LTE or NR.

For example, the method in FIG. 2, when performed, may be described as the base station sends a configuration of a third CSI-RS resource periodicity and a configuration of a third CSI report periodicity that are of a secondary cell to the UE. The third CSI-RS resource periodicity is used by the base station to send a third CSI-RS to the UE in a first time period and in a second time period. The third CSI report periodicity is used by the UE to report CSI of the secondary cell to the base station in the first time period and in the second time period. Alternatively, the method may be described as the base station sends a configuration of a third CSI-RS resource periodicity and a configuration of a third CSI report periodicity that are of a secondary cell to the UE. The third CSI-RS resource periodicity is used by the base station to send, starting from activation of the secondary cell, a third CSI-RS to the UE. The third CSI report periodicity is used by the UE to report, starting from the activation of the secondary cell, CSI of the secondary cell to the base station.

In the embodiments of this application, "first", "second", "third", and the like are used for distinguishing, and are not used to limit a size or a sequence.

The foregoing describes the method provided in the embodiments of this application from a perspective of interaction between the base station and the UE. To implement functions in the method provided in the embodiments of this application, the base station and the UE each may include a hardware structure and/or a software module, to implement the foregoing functions by using the hardware structure, the software module, or a combination of the hardware structure and the software module. Whether a function in the foregoing functions is performed in the hardware structure, the software module, or the combination of the hardware structure and the software module depends on a specific application and a design constraint condition of the technical solutions.

Figure 6:
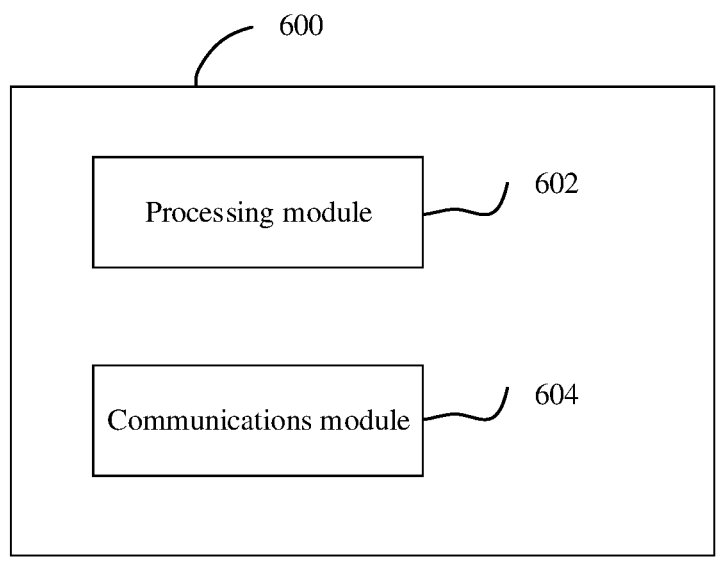
FIG. 6 and FIG. 7 are schematic structural diagrams of an apparatus according to an embodiment of this application.

FIG. 6 is a schematic structural diagram of an apparatus 600 according to an embodiment of this application. The apparatus 600 may be UE or a base station, and can implement the method provided in the embodiments of this application, the apparatus 600 may be an apparatus that can support the UE or the base station in implementing the method provided in the embodiments of this application, or the apparatus 600 may be mounted in the base station or the UE. The apparatus 600 may be a hardware structure, a software module, or a combination of a hardware structure and a software module. The apparatus 600 may be implemented by using a chip system.

The apparatus 600 includes a processing module 602 and a communications module 604. The processing module 602 may generate information to be sent, and may send the information by using the communications module 604. The processing module 602 may receive information by using the communications module 604, and process the received information. The processing module 602 is coupled to the communications module 604.

The coupling in this embodiment of this application is indirect coupling or connection between apparatuses, units, or modules for information exchange between the apparatuses, the units, or the modules, and may be in electrical, mechanical, or other forms. The coupling may be a wired connection or a wireless connection.

In this embodiment of this application, the communications module may be a circuit, a module, a bus, an interface, a transceiver, or another apparatus that can implement a transceiver function. This is not limited in this embodiment of this application.

Figure 7:
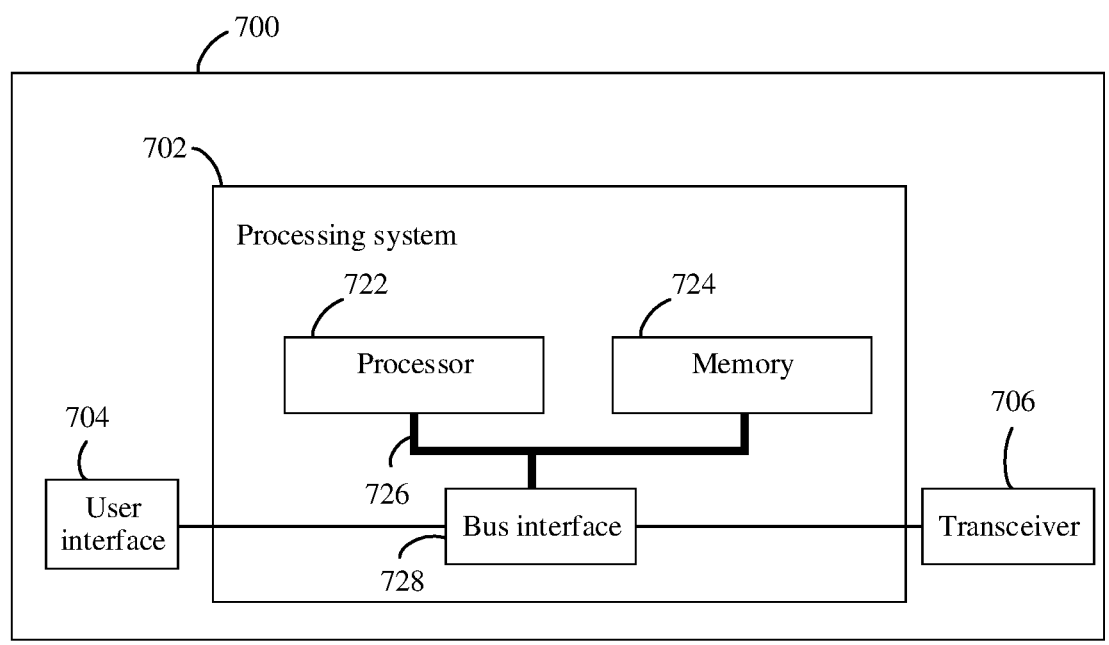

FIG. 7 is a schematic structural diagram of an apparatus 700 according to an embodiment of this application. The apparatus 700 may be a terminal device or a base station, and can implement the method provided in the embodiments of this application, the apparatus 700 may be an apparatus that can support the terminal device or the base station in implementing the method provided in the embodiments of this application, for example, a chip system, or the apparatus 700 may be mounted in the base station or the terminal device.

As shown in FIG. 7, the apparatus 700 includes a processing system 702, configured to implement or support a terminal device or a base station in implementing the method provided in the embodiments of this application. The processing system 702 may be a circuit, and the circuit may be implemented by using a chip system. The processing system 702 includes one or more processors 722 that may be configured to implement or support a terminal device or a base station in implementing the method provided in the embodiments of this application. When the processing system 702 includes another apparatus in addition to the processor 722, the processor 722 may further be configured to manage the another apparatus included in the processing system 702. For example, the another apparatus may be one or more of the following memory 724, bus 726, and bus interface 728. For example, the processor 722 may be configured to manage the memory 724, or the processor 722 may be configured to manage the memory 724, the bus 726, and the bus interface 728.

The processing system 702 may further include one or more memories 724, configured to store instructions and/or data. Further, the memory 724 may further be included in the processor 722. If the processing system 702 includes the memory 724, the processor 722 may be coupled to the memory 724. The processor 722 may cooperate with the memory 724 in performing an operation. The processor 722 may execute the instructions stored in the memory 724. When executing the instructions stored in the memory 724, the processor 722 may implement or support UE or a base station in implementing the method provided in the embodiments of this application. The processor 722 may further read the data stored in the memory 724. The memory 724 may further store data that is obtained when the processor 722 executes instructions.

In this embodiment of this application, the memory includes a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus having a storage function, for example, a circuit, a component, or a software module.

The processing system 702 may further include the bus interface 728, configured to be an interface between the bus 726 and another apparatus. The bus interface may also be referred to as a communications interface. In this embodiment of this application, the communications interface may be a circuit, a module, a bus, an interface, a transceiver, or another apparatus that can implement a transceiver function. This is not limited in this embodiment of this application.

The apparatus 700 may further include a transceiver 706, configured for communication with another communications device through a transmission medium, so that another apparatus in the apparatus 700 may communicate with the another communications device. The another apparatus may be the processing system 702. For example, the another apparatus in the apparatus 700 may communicate with the another communications device, and receive and/or send corresponding information by using the transceiver 706. It may also be described as that the another apparatus in the apparatus 700 may receive corresponding information, where the corresponding information is received by the transceiver 706 through the transmission medium, and the corresponding information may be exchanged between the transceiver 706 and the another apparatus in the apparatus 700 through the bus interface 728 or through the bus interface 728 and the bus 726, and/or the another apparatus in the apparatus 700 may send corresponding information, where the corresponding information is sent by the transceiver 706 through the transmission medium, and the corresponding information may be exchanged between the transceiver 706 and the another apparatus in the apparatus 700 through the bus interface 728 or through the bus interface 728 and the bus 726.

The apparatus 700 may further include a user interface 704. The user interface 704 is an interface between a user and the apparatus 700, and may be used for information exchange between the user and the apparatus 700. For example, the user interface 704 may be at least one of a keyboard, a mouse, a display, a speaker, a microphone, and a joystick.

The foregoing describes, from a perspective of the apparatus 700, an apparatus structure provided in this embodiment of this application. In the apparatus, the processing system 702 includes the processor 722, and may further include one or more of the memory 724, the bus 726, and the bus interface 728, to implement the method provided in this embodiment of this application. The processing system 702 also falls within the protection scope of this application.

In the apparatus embodiments of this application, division into modules of the apparatus is logical function division and may be other division in actual implementation. For example, all the function modules of the apparatus may be integrated into one module, or may be separated from each other, or at least two function modules may be integrated into one module.

All or some of the foregoing methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions of this application, but not to limit the protection scope of this application. Any modification, equivalent replacement, improvement, and the like made on the basis of the technical solutions of this application shall fall within the protection scope of this application.

What is claimed is:

1. An apparatus, comprising:
a communications interface;
one or more processors in communication with the communications interface and to a non-transitory memory storage; and
the non-transitory memory storage in communication with the one or more processors and having a computer-executable program stored thereon, the program including instructions for:
receiving, from a network device, while a secondary cell of a terminal device is deactivated, a configuration of a first channel state information reference signal (CSI-RS) resource periodicity and a configuration of a first channel state information (CSI) report periodicity that are of the secondary cell of the terminal device, wherein the first CSI-RS resource periodicity is associated with receiving a first CSI-RS from the network device in a first time period, wherein the first CSI report periodicity is associated with reporting CSI of the secondary cell to the network device in the first time period, and wherein, in the first time period, a physical downlink shared channel (PDSCH) and a physical downlink control channel (PDCCH) are not detected in a first bandwidth part (BWP) of the terminal device in the secondary cell; and
receiving, from the network device, while the secondary cell is deactivated, a configuration of a second CSI-RS resource periodicity and a configuration of a second CSI report periodicity that are of the secondary cell of the terminal device, wherein the second CSI-RS resource periodicity is associated with receiving a second CSI-RS from the network device in a second time period, and wherein the second CSI report periodicity is associated with reporting CSI of the secondary cell to the network device in the second time period, wherein the second time period is after the first time period.

2. The apparatus according to claim 1, wherein the first CSI-RS resource periodicity is associated with receiving the first CSI-RS from the network device in the first time period and in the first BWP.

3. The apparatus according to claim 2, wherein the computer program further includes instructions for performing at least one of:
preconfiguring the first BWP; or
receiving a first indication from the network device, wherein the first indication indicates the first BWP.

4. The apparatus according to claim 1, wherein the computer program further includes instructions for:
reporting, starting from a time unit n+k, the CSI of the secondary cell to the network device based on the first CSI report periodicity, wherein a time unit n is a time unit in which an activation command is received, wherein the activation command indicates activation of the secondary cell for the terminal device, and wherein k is an integer greater than or equal to 0 and subframe less than $k_1 + 3 \times N_{slot}^{subframe,\mu} + 1$, $k_1$ indicates a hybrid automatic repeat request (HARQ) feedback latency of a physical downlink shared channel (PDSCH), $N_{slot}^{subframe,\mu}$ is a quantity of slots comprised in a subframe of a frame structure numerology $\mu$, and $\mu$ is a frame structure numerology of an uplink channel used for reporting the CSI of the secondary cell.

5. The apparatus according to claim 1, wherein the first time period is a duration between a start of activation of the secondary cell and completion of activation of the secondary cell, and wherein the second time period is a duration since the completion of the activation of the secondary cell.

6. The apparatus according to claim 1, wherein the configuration of the first CSI-RS resource periodicity, the configuration of the first CSI report periodicity, the configuration of the second CSI-RS resource periodicity, and the configuration of the second CSI report periodicity are disposed in a same piece of signaling.

7. A method, comprising:
sending, while a secondary cell of a terminal device is deactivated, a configuration of a first channel state information reference signal (CSI-RS) resource periodicity and a configuration of a first channel state information (CSI) report periodicity that are of the secondary cell of the terminal device, wherein the first CSI-RS resource periodicity is associated with sending a first CSI-RS in a first time period, wherein the first CSI report periodicity is associated with receiving CSI of the secondary cell from the terminal device in the first time period, and wherein, in the first time period, a physical downlink shared channel (PDSCH) and a physical downlink control channel (PDCCH) are not sent in a first bandwidth part (BWP) of the terminal device in the secondary cell; and
sending, while the secondary cell is deactivated, a configuration of a second CSI-RS resource periodicity and a configuration of a second CSI report periodicity that are of the secondary cell of the terminal device, wherein the second CSI-RS resource periodicity is associated with sending a second CSI-RS in a second time period, and wherein the second CSI report periodicity is associated with receiving CSI of the secondary cell from the terminal device in the second time period, wherein the second time period is after the first time period.

8. The method according to claim 7, wherein the first CSI-RS resource periodicity is associated with sending the first CSI-RS in the first time period and in the first BWP.

9. The method according to claim 8, wherein the method further comprises performing at least one of:
preconfiguring the first BWP; or
sending a first indication, wherein the first indication indicates the first BWP.

10. The method according to claim 7, wherein the method further comprises:
receiving, starting from a time unit n+k and based on the first CSI report periodicity, the CSI of the secondary cell reported by the terminal device, wherein a time unit n is a time unit in which an activation command is sent, wherein the activation command indicates activation of the secondary cell for the terminal device, and wherein k is an integer greater than or equal to 0 and less than $k_1 + 3 \times N_{slot}^{subframe,\mu} + 1$, $k_1$ indicates a hybrid automatic repeat request (HARQ) feedback latency of a physical downlink shared channel (PDSCH), $N_{slot}^{subframe,\mu}$ is a quantity of slots comprised in a subframe of a frame structure numerology $\mu$, and $\mu$ is a frame structure numerology of an uplink channel used for receiving the CSI of the secondary cell.

11. The method according to claim 7, wherein the first time period is a duration between a start of activation of the secondary cell and completion of the activation of the secondary cell, and wherein the second time period is a duration since the completion of the activation of the secondary cell.

12. The method according to claim 7, wherein the configuration of the first CSI-RS resource periodicity, the configuration of the first CSI report periodicity, the configuration of the second CSI-RS resource periodicity, and the configuration of the second CSI report periodicity are disposed in a same piece of signaling.

13. An apparatus, comprising:
a communications interface;
one or more processors in communication with the communications interface and to a non-transitory memory storage; and
the non-transitory memory storage in communication with the one or more processors and having a computer-executable program stored thereon, the program including instructions for:
sending, while a secondary cell of a terminal device is deactivated, a configuration of a first channel state information reference signal (CSI-RS) resource periodicity and a configuration of a first channel state information (CSI) report periodicity that are of the secondary cell of the terminal device, wherein the first CSI-RS resource periodicity is associated with sending a first CSI-RS in a first time period, wherein the first CSI report periodicity is associated with receiving CSI of the secondary cell from the terminal device in the first time period, and wherein, in the first time period, a physical downlink shared channel (PDSCH) and a physical downlink control channel (PDCCH) are not sent in a first bandwidth part (BWP) of the terminal device in the secondary cell; and
sending, while the secondary cell is deactivated, a configuration of a second CSI-RS resource periodicity and a configuration of a second CSI report periodicity that are of the secondary cell of the terminal device, wherein the second CSI-RS resource periodicity is associated with sending a second CSI-RS in a second time period, and wherein the second CSI report periodicity is associated with receiving CSI of the secondary cell from the terminal device in the second time period, wherein the second time period is after the first time period.

14. The apparatus according to claim 13, wherein the first CSI-RS resource periodicity is associated with sending the first CSI-RS in the first time period and in the first BWP.

15. The apparatus according to claim 14, wherein the program further includes instructions for performing at least one of:
preconfiguring the first BWP; or
sending a first indication, wherein the first indication is used to indicate the first BWP.

16. The apparatus according to claim 13, wherein the program further includes instructions for:
receiving, starting from a time unit n+k and based on the first CSI report periodicity, the CSI of the secondary cell reported by the terminal device, wherein a time unit n is a time unit in which an activation command is sent, wherein the activation command indicates activation of the secondary cell for the terminal device, and wherein k is an integer greater than or equal to 0 and less than $k_1 + 3 \times N_{slot}^{subframe,\mu} + 1$, $k_1$ indicates a hybrid automatic repeat request (HARQ) feedback latency of a physical downlink shared channel (PDSCH), $N_{slot}^{subframe,\mu}$ is a quantity of slots comprised in a subframe of a frame structure numerology $\mu$, and $\mu$ is a frame structure numerology of an uplink channel used for receiving the CSI of the secondary cell.

17. The apparatus according to claim 13, wherein the first time period is a duration between a start of activation of the secondary cell and completion of the activation of the secondary cell, and wherein the second time period is a duration since the completion of the activation of the secondary cell.

* * * * *

UNITED STATES PATENT AND TRADEMARK OFFICE
CERTIFICATE OF CORRECTION

PATENT NO. : 12,041,644 B2
APPLICATION NO. : 17/371616
DATED : July 16, 2024
INVENTOR(S) : Xiao et al.

It is certified that error appears in the above-identified patent and that said Letters Patent is hereby corrected as shown below:

In the Claims

In Column 33, in Claim 4, Line 62, after "0 and" delete "subframe".

In Column 34, in Claim 10, Line 58, delete "$N_{slot}^{subframe,\mu+}1$," and insert -- $N_{slot}^{subframe,\mu}+1$, --.

In Column 36, in Claim 16, Line 26, delete "$N_{slot}^{subframe,\mu+}1$," and insert -- $N_{slot}^{subframe,\mu}+1$, --.

Signed and Sealed this
Twentieth Day of August, 2024

Katherine Kelly Vidal
*Director of the United States Patent and Trademark Office*